US012096015B2

(12) United States Patent
Cao et al.

(10) Patent No.: US 12,096,015 B2
(45) Date of Patent: Sep. 17, 2024

(54) DECODER CONFIGURATION METHOD, APPARATUS, MEDIUM AND ELECTRONIC DEVICE

(71) Applicant: TENCENT TECHNOLOGY (SHENZHEN) COMPANY LIMITED, Shenzhen (CN)

(72) Inventors: Hongbin Cao, Shenzhen (CN); Sijia Chen, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 119 days.

(21) Appl. No.: 17/989,544

(22) Filed: Nov. 17, 2022

(65) Prior Publication Data

US 2023/0092261 A1    Mar. 23, 2023

Related U.S. Application Data

(63) Continuation of application No. PCT/CN2022/075745, filed on Feb. 10, 2022.

(30) Foreign Application Priority Data

Feb. 24, 2021   (CN) .......................... 202110208285.8
Dec. 29, 2021   (CN) .......................... 202111647541.X

(51) Int. Cl.
*H04N 19/42*   (2014.01)
*H04N 19/103*   (2014.01)
(Continued)

(52) U.S. Cl.
CPC ........... *H04N 19/42* (2014.11); *H04N 19/103* (2014.11); *H04N 19/136* (2014.11); *H04N 21/4402* (2013.01)

(58) Field of Classification Search
CPC ....................................................... H04N 19/42
(Continued)

(56) References Cited

U.S. PATENT DOCUMENTS 7,330,509 B2    2/2008   Lu et al.
10,477,203 B2   11/2019  Chuang et al.
(Continued)

FOREIGN PATENT DOCUMENTS

CN   104954863 A   9/2015
CN   112087633 A   12/2020

OTHER PUBLICATIONS

The World Intellectual Property Organization (WIPO) International Search Report for PCT/CN2022/075745 May 5, 2022 6 Pages (including translation).

(Continued)

*Primary Examiner* — Yulin Sun
(74) *Attorney, Agent, or Firm* — ANOVALAW GROUP PLLC

(57) ABSTRACT

A decoder configuration method includes: acquiring at least two compatibility grade configurations for configuring decoding parameters of a decoder, the different compatibility grade configurations being different in priority level, decoding property and decoder compatibility; selecting one compatibility grade configuration from the compatibility grade configurations according to the priority levels from high to low; configuring the decoder according to the compatibility grade configuration; starting the decoder, and performing decoding abnormality detection processing on the decoder to obtain an abnormality detection result; and performing hardware decoding processing on a to-be-decoded video according to the compatibility grade configuration to obtain a decoding processing result based on the abnormality detection result indicating that the decoder is (Continued)

normal, and determining that the current compatibility grade configuration is applicable to the decoder according to the decoding processing result in response to a determination that the decoding processing result indicates successful decoding.

20 Claims, 10 Drawing Sheets

(51) Int. Cl.
*H04N 19/136* (2014.01)
*H04N 21/4402* (2011.01)

(58) Field of Classification Search
USPC .................................................. 375/240.02
See application file for complete search history.

(56) References Cited

U.S. PATENT DOCUMENTS

| | | |
|---|---|---|
| 10,575,013 B2 | 2/2020 | Liu et al. |
| 10,681,383 B2 | 6/2020 | Ye et al. |
| 11,019,339 B2 | 5/2021 | Liu et al. |
| 2014/0348156 A1 | 11/2014 | Zheng et al. |
| 2017/0026648 A1* | 1/2017 | Wu .................... H04N 19/13 |
| 2017/0310342 A1* | 10/2017 | Yen .................... H03M 13/3715 |
| 2019/0373274 A1* | 12/2019 | Yin .................... H04N 19/427 |
| 2021/0344938 A1 | 11/2021 | Han |
| 2022/0150514 A1* | 5/2022 | Miller ................ H04N 19/436 |

OTHER PUBLICATIONS

Shan Liu et al., "Joint Temporal-Spatial Bit Allocation for Video Coding With Dependency", Jan. 2005, vol. 15, No. 1, IEEE Transactions on Circuits and Systems for Video Technology.

Shan Liu et al., "Joint Temporal-Spatial Rate Control for Adaptive Video Transcoding", p. II-225-II-228, vol. 2, International Conference on Multimedia and Expo. ICME 2003.

Jian Lou et al., "Trick-Play Optimization for H.264 Video Decoding", p. 132-144, Journal of Information Hiding and Multimedia Signal Processing.

Jian Lou et al., "Complexity and Memory Efficient GOP Structures Supporting VCR Functionalities in H.264/AVC", May 2008, IEEE International Symposium on Circuits and Systems.

Shan Liu et al., "Overview of HEVC extensions on screen content coding", vol. 4, APSIPA Transactions on Signal and Information Processing.

Xiaozhong Xu et al., "Recent advances in video coding beyond the HEVC standard", 2019, vol. 8, APSIPA Transactions on Signal and Information Processing.

Xiaozhong Xu et al., "DPB considerations when current picture is a reference picture", 2015, Joint Collaborative Team on Video Coding (JCT-VC) of ITU-T SG 16 WP 3 and ISO/IEC JTC 1/SC 29/WG 11.

Jian Lou et al., "Rate-Distortion Optimized Rate Allocation for Motion-Compensated Predictive Video Codecs Using PixelRank", Oct. 2014, p. 3170-3174, IEEE International Conference on Image Processing.

Xiaozhong Xu et al., "Intra Block Copy in HEVC Screen Content Coding Extensions", p. 409-419, vol. 6, Issue 4.IEEE Journal on Emerging and Selected Topics in Circuits and Systems.

* cited by examiner

DECODER CONFIGURATION METHOD, APPARATUS, MEDIUM AND ELECTRONIC DEVICE

RELATED APPLICATION(S)

This application is a continuation application of PCT Patent Application No. PCT/CN2022/075745 filed on Feb. 10, 2022, which in turn claims priority to Chinese Patent Application No. 2021102082858, entitled "DECODER CONFIGURATION METHOD, APPARATUS, MEDIUM AND ELECTRONIC DEVICE" and filed with the National Intellectual Property Administration, PRC on Feb. 24, 2021, and claims priority to Chinese Patent Application No. 202111647541X, entitled "DECODER CONFIGURATION METHOD, APPARATUS, MEDIUM AND ELECTRONIC DEVICE" and filed with the National Intellectual Property Administration, PRC on Dec. 29, 2021, all of which are incorporated herein by reference in entirety.

FIELD OF THE TECHNOLOGY

The present disclosure relates to the field of computer technologies, and in particular to a decoder configuration method, a decoder configuration apparatus, a computer-readable medium and an electronic device.

BACKGROUND

A phenomenon of decoding frame hoarding may occur to a decoding chip of a terminal device due to problems about properties and power consumption. Decoding frame hoarding means that video frames are cached in an internal cache area of a decoder, and video images cannot be outputted until the internal cache area is fully filled. In a low-latency service scenario (such as cloud gaming), a video image may be outputted as soon as possible after one video frame is decoded. Generally, parameters of the decoding chip are configured into a real-time communication mode or low-latency mode to solve the problem of decoding frame hoarding.

The information disclosed in the above background part is used only for enhancing the understanding of the background of the present disclosure, and therefore may include information that does not constitute information known to a person of ordinary skill in the art.

SUMMARY

The present disclosure aims to provide a decoder configuration method, a decoder configuration apparatus, a computer-readable medium and an electronic device to solve the technical problems about not high compatibility and low decoding efficiency at least to a certain degree.

Other characteristics and advantages of the present disclosure become apparent from the following detailed description, or may be learned in part through the practice of the present disclosure.

In one aspect, the present disclosure provides a decoder configuration method, including: acquiring at least two compatibility grade configurations used for configuring decoding parameters of a decoder, the different compatibility grade configurations being different in priority level, decoding property and decoder compatibility; selecting one compatibility grade configuration from the compatibility grade configurations according to the priority levels from high to low; configuring the decoder according to the compatibility grade configuration; starting the decoder, and performing decoding abnormality detection processing on the decoder to obtain an abnormality detection result; and performing hardware decoding processing on a to-be-decoded video according to the compatibility grade configuration to obtain a decoding processing result in response to a determination that the abnormality detection result indicates that the decoder is normal, and determining that the current compatibility grade configuration is applicable to the decoder in response to a determination that the decoding processing result indicates that decoding is successful.

In another aspect, the present disclosure provides a decoder configuration apparatus, including: a memory storing computer program instructions; and a processor coupled to the memory and configured to execute the computer program instructions and perform: acquiring at least two compatibility grade configurations used for configuring decoding parameters of a decoder, the different compatibility grade configurations being different in priority level, decoding property and decoder compatibility; selecting one compatibility grade configuration from the compatibility grade configurations according to the priority levels from high to low; configuring the decoder according to the compatibility grade configuration; starting the decoder, and performing decoding abnormality detection processing on the decoder to obtain an abnormality detection result; and performing hardware decoding processing on a to-be-decoded video according to the compatibility grade configuration to obtain a decoding processing result in response to a determination that the abnormality detection result indicates that the decoder is normal, and determining that the current compatibility grade configuration is applicable to the decoder in response to a determination that the decoding processing result indicates that decoding is successful.

In yet another aspect, the present disclosure provides a computer-readable medium, storing a computer program, the computer program, when executed by a processor, implementing the decoder configuration method in the technical solutions.

It is to be understood that the general descriptions and the following detailed descriptions are merely for illustration and explanation purposes and are not intended to limit the present disclosure.

Other aspects of the present disclosure can be understood by those skilled in the art in light of the description, the claims, and the drawings of the present disclosure.

BRIEF DESCRIPTION OF THE DRAWINGS

To facilitate a better understanding of technical solutions of certain embodiments of the present disclosure, accompanying drawings are described below. The accompanying drawings are illustrative of certain embodiments of the present disclosure, and a person of ordinary skill in the art may still derive other drawings from these accompanying drawings without having to exert creative efforts. When the following descriptions are made with reference to the accompanying drawings, unless otherwise indicated, same numbers in different accompanying drawings may represent same or similar elements. In addition, the accompanying drawings are not necessarily drawn to scale.

DETAILED DESCRIPTION

Figure 1:
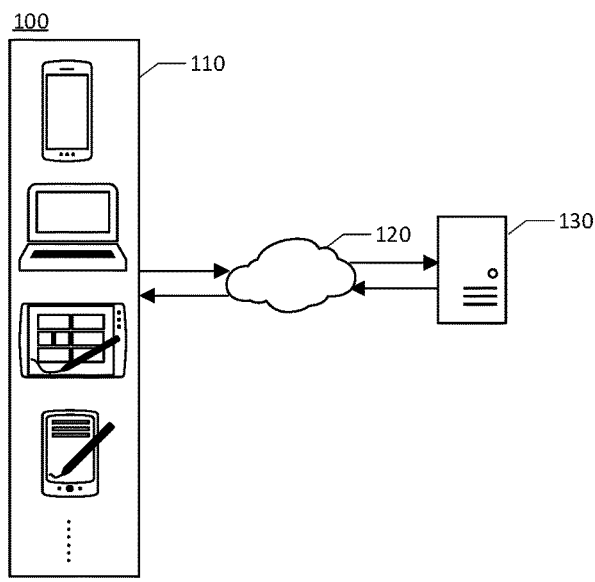
FIG. 1 schematically illustrates an architectural diagram of an exemplary system according to certain embodiment(s) of the present disclosure.

To make objectives, technical solutions, and/or advantages of the present disclosure more comprehensible, certain embodiments of the present disclosure are further elaborated in detail with reference to the accompanying drawings. The embodiments as described are not to be construed as a limitation to the present disclosure. All other embodiments obtained by a person of ordinary skill in the art without creative efforts shall fall within the protection scope of embodiments of the present disclosure.

When and as applicable, the term "an embodiment," "one embodiment," "some embodiment(s)," "some embodiments," "certain embodiment(s)," or "certain embodiments" may refer to one or more subsets of all possible embodiments. When and as applicable, the term "an embodiment," "one embodiment," "some embodiment(s)," "some embodiments," "certain embodiment(s)," or "certain embodiments" may refer to the same subset or different subsets of all the possible embodiments, and can be combined with each other without conflict.

In certain embodiments, the term "based on" is employed herein interchangeably with the term "according to."

In addition, the described features, structures, or characteristics may be combined in one or more embodiments in any appropriate manner. In the following descriptions, more specific details are provided to provide a comprehensive understanding of the embodiments of the present disclosure. However, a person skilled in the art is to be aware of that, the technical solutions in the present disclosure may be implemented without one or more of the particular details, or other methods, unit, apparatus, or step may be adopted. Well-known methods, apparatuses, implementations, or operations are not shown or described in detail, to avoid obscuring the aspects of the present disclosure.

The block diagrams shown in the accompanying drawings is merely a functional entity and does not necessarily correspond to a physically independent entity. To be specific, such functional entities may be implemented in the form of software, or implemented in one or more hardware modules or integrated circuits, or implemented in different networks and/or processor apparatuses and/or microcontroller apparatuses.

The flowcharts shown in the accompanying drawings are merely examples for descriptions, may not include all content and operations/steps, and may not be performed in the described orders either. For example, some operations/steps may be further divided, while some operations/steps may be combined or partially combined. Therefore, an actual execution order may change.

In related technologies in the art, factors such as properties and power consumption will be integrated for designing decoders of most of current terminal devices such as mobile phones, and thus decoding chips are uncertain to immediately output a video image after a video frame is decoded in the decoders. For example, part of the decoding chips will have a limitation in decoding frame hoarding.

Decoding frame hoarding means that video frames are cached in internal cache areas of the decoders, and the video images cannot be outputted until the internal cache areas are fully filled.

But, in a low-latency video service scenario, a video image may be outputted as soon as possible after one video frame is decoded.

Generally, a low-latency scheme satisfies requirements of the low-latency service scenario basically by configuring corresponding parameters of an Android system, namely by setting the parameters into a real-time communication mode or a low-latency mode.

But, compatibility of the Android version is not high. For example, a priority parameter is introduced by Android 6.0, and a low-latency parameter is introduced by Android 11.0. The two parameters are realized by part of chip vendors in a private interface manner before being officially listed into an Android official brochure, but the problem about compatibility possibly still exists for other most of chips due to direct configuration. Taking a chip MSM8916 as an example, under the configuration in the real-time communication mode, the configuration will fail when a target frame rate is set to 60.

Moreover, the situation that part of chip vendors has private interfaces is not considered. In addition, chip decoding efficiency may also be higher through configuration of other parameters according to official documents. In certain embodiment(s), configuring other parameters also may consider the problem about compatibility.

Based on the problems in the above scheme, the present disclosure newly provides a decoder configuration method, a decoder configuration apparatus, a computer-readable medium and an electronic device based on a cloud technology.

The cloud technology is a hosting technology that unifies a series of resources such as hardware, software, and networks in a wide area network or a local area network to implement computing, storage, processing, and sharing of data.

A cloud technology is a collective name of a network technology, an information technology, an integration technology, a management platform technology, an application technology, and the like based on an application of a cloud computing service mode, and may form a resource pool. Usage is based on a requirement and is flexible and convenient. A cloud computing technology becomes an important support. A background service of a technical network system requires a large amount of computing and storage resources, such as a video website, an image website, and more portal websites. As the Internet industry is highly developed and applied, each article may have its own identifier in the future and may be transmitted to a background system for logical processing. Data at different levels is separately processed, and data in various industries requires system support and this can only be implemented through cloud computing.

Cloud gaming may also be referred to as gaming on demand, which is an online game technology based on a cloud computing technology. High-quality games can run at a thin client with relatively-limited graphic processing and data operation capabilities through the cloud gaming technology. In a cloud gaming scenario, a game runs in a cloud server instead of a player game terminal, and a game scene is rendered into video and audio stream through the cloud server and transmitted to the player game terminal by a network. The player game terminal may have a basic capability of playing streaming media and a capability of acquiring and sending player input instructions to the cloud server without powerful graphic operating and data processing capabilities.

Cloud Computing Education (CCEDU) refers to an education platform service applied on the basis of a cloud computing service model. On a cloud platform, all educational institutions, training institutions, recruit service institutions, propaganda institutions, industry associations, management institutions, industry media, legal institutions and the like are centralized into a resource pool through cloud integration, and the resources are mutually displayed, interact with one another and communicate according to may reach an agreement, thereby reducing educational costs and improving efficiency.

A cloud conference is an efficient, convenient and low-cost conference form based on the cloud computing technology. A user can rapidly, efficiently and synchronously share audios, data files and videos only by performing simple and usable operation via an Internet interface, while the user is assisted by a cloud conference service provider to operate data transmission, processing and other complex technologies in the conference.

Current domestic cloud conferences focus on service contents with Software as a Service (SaaS) model as a subject, including service forms via telephones, network, videos and the like, and a video conference based on cloud computing is referred to as the cloud conference.

In the age of cloud conference, data transmission, processing and storage are all processed by computer resources of video conference vendors so that the user can perform the efficient teleconference only by opening a browser and logging in a corresponding interface without purchasing expense hardware and installing complex software.

A cloud conference system supports multi-server dynamic cluster deployment and provides a plurality of high-performance servers, thereby greatly improving conference stability, security and usability. In recent years, the video conference is popular with many users because of significantly improving communication efficiency, reducing communication costs and upgrading an inner management level, and is widely applied to various fields such as government, army, traffic, transportation, finance, operators, education and enterprises. It is no doubt that the video conference has stronger attraction in convenience, rapidness and usability after applying cloud computing, which surely will motivate a new climax of video conference application.

In cloud gaming, cloud education, cloud conference and other low-latency video service scenarios based on the cloud technology, the decoder configuration method can solve the problem about decoding frame hoarding of the decoder and the problem about time delay in a decoder hardware decoding processing process, a decoding frame rate is higher, hardware rapidly performs decoding and exports frames, the requirements of the low-latency video service scenarios are satisfied, the problem about compatibility of different decoders is solved as well, and an optimal decoding property of the decoders is brought into play.

FIG. 1 illustrates a schematic diagram of an exemplary system architecture applying a technical solution of the present disclosure.

As shown in FIG. 1, the system architecture 100 may include a terminal 110, a network 120, and a server side 130. The terminal 110 and the server side 130 are connected by the network 120.

The terminal 110 may be a smartphone, a tablet computer, a notebook computer, a desktop computer, a smart speaker, a smartwatch, or the like, but is not limited thereto. The network 120 may be a communication medium capable of providing various connection types for communication links between the terminal 110 and the server side 130, such as a wire communication link, a wireless communication link or an optical cable, which is not limited by the present disclosure. The server 130 may be an independent physical server, or may be a server cluster including a plurality of physical servers or a distributed system, or may be a cloud server providing basic cloud computing services, such as a cloud service, a cloud database, cloud computing, a cloud function, cloud storage, a network service, cloud communication, a middleware service, a domain name service, a security service, a content delivery network (CDN), big data, and an artificial intelligence platform.

In certain embodiment(s), the terminal 110 acquires at least two compatibility grade configurations used for configuring decoding parameters of a decoder, the different compatibility grade configurations being different in priority level, decoding property and decoder compatibility; sequentially selects one compatibility grade configuration from the compatibility grade configurations according to the priority levels from high to low; and specific to the current selected compatibility grade configuration: configures the decoder according to the compatibility grade configuration; starts the decoder, and performs decoding abnormality detection processing on the decoder to obtain an abnormality detection result; and performs hardware decoding processing on a to-be-decoded video to obtain a decoding processing result according to the compatibility grade configuration based on the abnormality detection result indicating that the decoder is normal, and determines that the current compatibility grade configuration is applicable to the decoder according to the decoding processing result if the decoding processing result indicates that decoding is successful.

In addition, the decoder configuration method in the embodiment of the present disclosure may be applied to the terminal and may also be applied to the server side, which is not specially limited by the present disclosure. The embodiment of the present disclosure exemplarily introduces applying the decoder configuration method to the terminal 110.

The decoder configuration method, a decoder configuration apparatus, a computer-readable medium and an electronic device provided by the present disclosure are described in detail by combining specific implementations below.

Figure 2A:
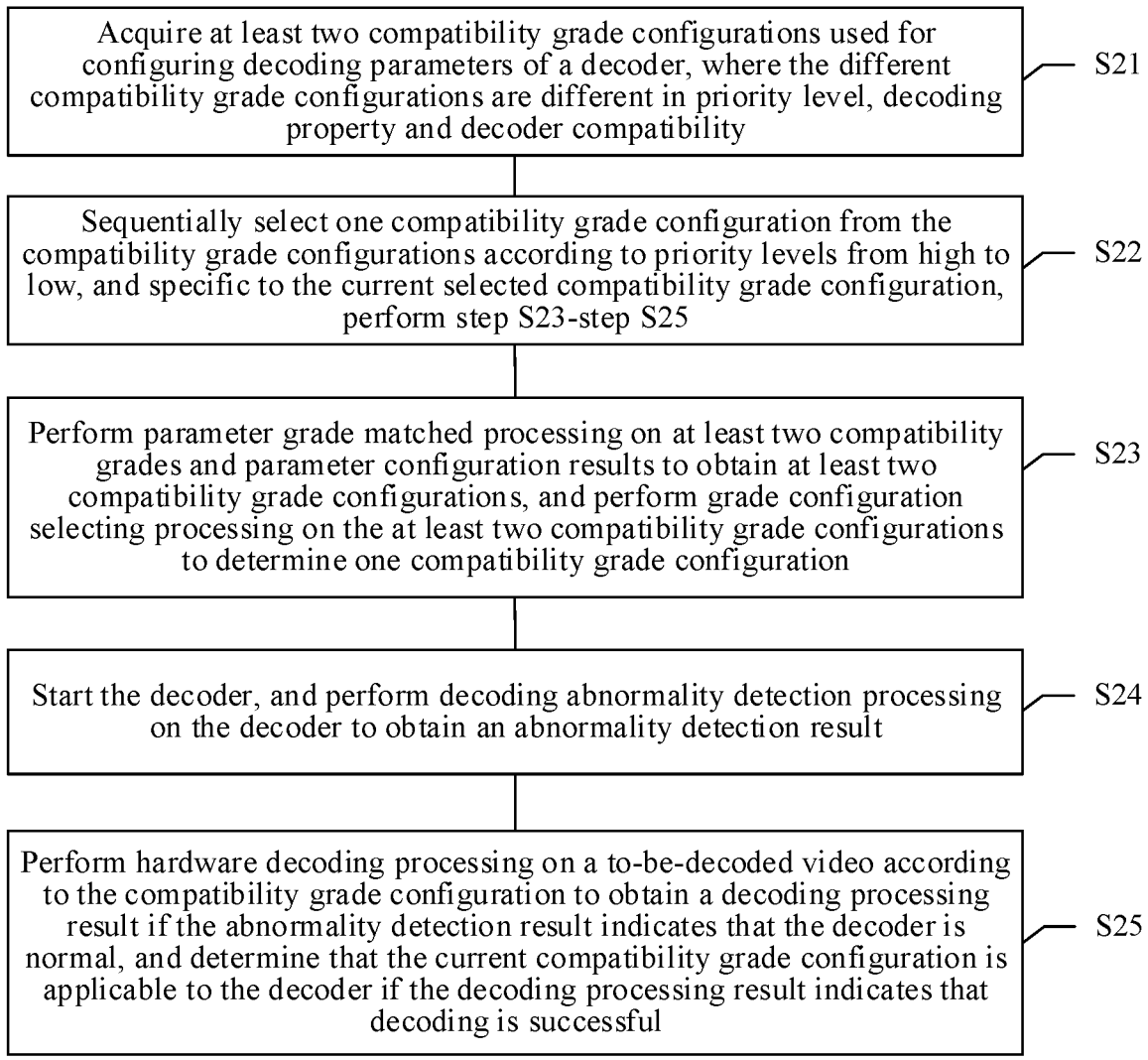
FIG. 2A-2B schematically illustrate a step flowchart of a decoder configuration method according to certain embodiment(s) of the present disclosure.

FIG. 2A illustrates a flowchart of a decoder configuration method in some embodiments of the present disclosure. As shown in FIG. 2A, the method may include the following steps.

S21: Acquiring at least two compatibility grade configurations used for configuring decoding parameters of a decoder, the different compatibility grade configurations being different in priority level, decoding property and decoder compatibility.

S22: Sequentially selecting one compatibility grade configuration from the compatibility grade configurations according to the priority levels from high to low, and specific to the current selected compatibility grade configuration, performing step S23-step S25.

S23: Configuring the decoder according to the compatibility grade configuration.

S24: Starting the decoder, and performing decoding abnormality detection processing on the decoder to obtain an abnormality detection result.

S25: Performing hardware decoding processing on a to-be-decoded video to obtain a decoding processing result according to the compatibility grade configuration if the abnormality detection result indicates that the decoder is normal, and determining that the current compatibility grade configuration is applicable to the decoder if the decoding processing result indicates that decoding is successful.

In some embodiments, before step S21, following operation may be firstly performed to determine at least two compatibility grade configurations according to a practical decoding demand. Following operation is included:

Acquiring decoding parameters of the decoder and determining a parameter configuration rule corresponding to the decoding demand.

Configuring the decoding parameters according to the parameter configuration rule to obtain a plurality of configuration results of the decoding parameters, different configuration results corresponding to different decoding properties.

Setting at least two compatibility grades according to the decoding parameters, the different compatibility grades being different in decoder compatibility.

Obtaining at least two compatibility grade configurations according to parameter grade matched processing of the at least two compatibility grades and the plurality of configuration results.

Figure 2B:
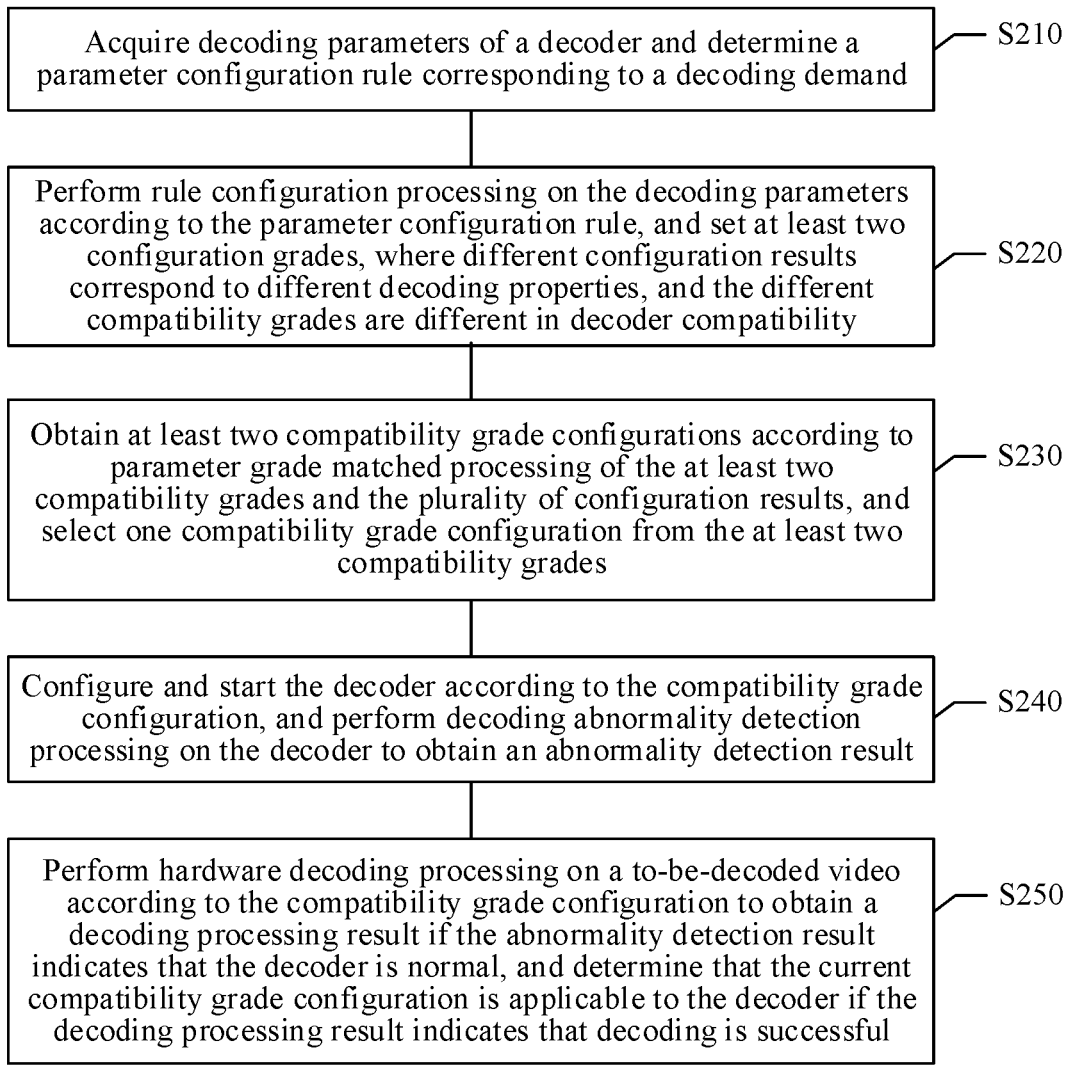

FIG. 2B schematically illustrates a step flowchart of a decoder configuration method in some embodiments of the present disclosure. As shown in FIG. 2B, the decoder configuration method may include the following steps:

S210: Acquiring decoding parameters of a decoder and determining a parameter configuration rule corresponding to a decoding demand.

S220: Configuring the decoding parameters according to the parameter configuration rule to obtain a plurality of configuration results of the decoding parameters and setting at least two compatibility grades, the different configuration results corresponding to different decoding properties, and the different compatibility grades being different in decoder compatibility.

S230: Obtaining at least two compatibility grade configurations according to parameter grade matched processing of the at least two compatibility grades and the plurality of configuration results, and selecting one compatibility grade configuration from the at least two compatibility grade configurations.

S240: Configuring and starting the decoder according to the compatibility grade configuration, and performing decoding abnormality detection processing on the decoder to obtain an abnormality detection result.

S250: Performing hardware decoding processing on a to-be-decoded video to obtain a decoding processing result according to the compatibility grade configuration if the abnormality detection result indicates that the decoder is normal, and determining that the current compatibility grade configuration is applicable to the decoder if the decoding processing result indicates that decoding is successful.

In the exemplary embodiment of the present disclosure, on one hand, the decoding parameters are configured, so that the problem about decoding frame hoarding of the decoder and the problem about time delay in a decoder hardware decoding processing process are solved, a decoding frame rate is higher, hardware rapidly performs decoding and exports frames, and the requirements of a low-latency video service scenario are satisfied; and on the other hand, compatibility logic configuration and parameter grade matched processing are performed on the decoding parameters to obtain the compatibility grade configurations, thereby solving the problem about compatibility of different decoders, and bringing the optimal decoding property of the decoders into play.

Various steps in the decoder configuration method are described in detail below.

In step S210, the decoding parameters of the decoder are acquired, and the parameter configuration rule corresponding to the decoding demand is determined.

In the exemplary embodiments of the present disclosure, decoding is a process of restoring a coded bitstream into original represented contents, and corresponds to coding. Decoding may include software decoding and hardware decoding.

Software decoding refers to compiling a decoding algorithm on a software level and achieving a decoding purpose by performing computing and coded bitstream processing via a central processing unit. Hardware decoding refers to decoding the coded bitstream by a hardware decoding apparatus included by the device. The hardware decoding apparatus may include a decoder such as decoding chip.

For example, when the decoder is a decoding chip of an Android system, decoding parameters may include parameters configurable by interfaces provided by the Android system, and the interfaces may include a setInteger interface and a setFeatureEnabled interface. The setInteger interface is configured to bind parameters with a mapping type being int (integer), an application method is setInteger (int position, int val), position is used for assigning an $n^{th}$ parameter, and val is used for assigning a corresponding parameter value; and the setFeatureEnabled interface is configured to add any to-be-added specific function, etc.

Corresponding to the setInteger interface and the setFeatureEnabled interface, the decoding parameters may be "priority", "frame-rate", "low-latency" and "operating-rate" and may also include corresponding parameters of private interfaces provided by chip vendors, such as "vendor. qti- . . . -low-latency.enable", "vendor.hisi- . . . -low-latency-req" and "vendor . . . -low-latency.enable". Low-latency may correspond to two parameters of the setInteger interface and the setFeatureEnabled interface respectively.

The to-be-decoded video corresponding to the decoder is capable of being subjected to hardware decoding processing by the decoder.

Furthermore, the parameter configuration rule corresponding to the decoding demand is determined. According to the parameter configuration rule, the decoding parameters may be correspondingly configured. For example, when solving the problem of real time of the to-be-decoded video, the problem may be solved from two aspects including a target frame rate in a real-time communication mode and low-latency removal of a frame hoarding behavior of the decoder, and thus, the parameter configuration rule may consider the decoding parameters from the two aspects, thereby enabling the decoding parameters.

In certain embodiment(s), decoding parameters corresponding to the target frame rate in the real-time communication mode may include priority, frame-rate and operating-rate, and parameters corresponding to low-latency removal of the frame hoarding behavior of the decoder may include low-latency corresponding to the setInteger interface, low-latency corresponding to the setFeatureEnabled interface, and the corresponding parameters of the chip vendor private interfaces, such as "vendor.qti- . . . -low-latency.enable", "vendor.hisi- . . . -low-latency-req" and "vendor . . . -low-latency.enable".

In step S220, rule configuration processing is performed on the decoding parameters according to the parameter configuration rule to obtain a plurality of configuration results of the decoding parameters, and at least two compatibility grades are set.

In the exemplary embodiments of the present disclosure, after the parameter configuration rule is determined, rule configuration processing may be performed on the decoding parameters according to the parameter configuration rule.

Figure 3:
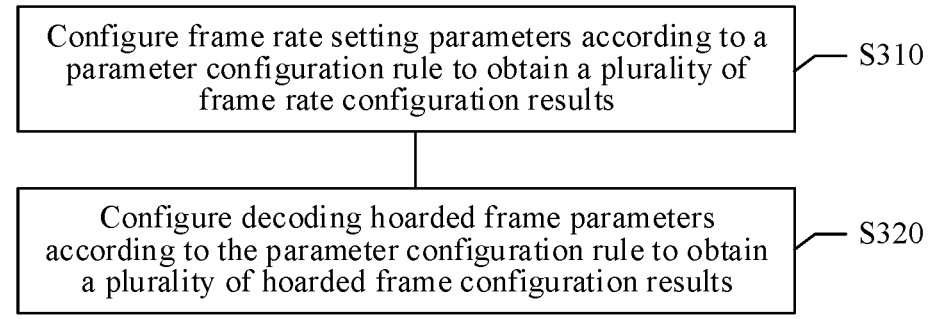
FIG. 3 schematically illustrates a step flowchart of a rule configuration processing method according to certain embodiment(s) of the present disclosure.

In some embodiments, decoding parameters include frame rate setting parameters and decoding hoarded frame parameters, and parameter configuration results include frame rate configuration results and hoarded frame configuration results, and besides, may include a default configuration result in which no configuration is performed on the decoding parameters. FIG. 3 illustrates a step flowchart of a rule configuration processing method. As shown in FIG. 3, the method at least may include the following steps: S310: Configuring frame rate setting parameters according to a parameter configuration rule to obtain a plurality of frame rate configuration results.

The frame rate setting parameters include priority, frame-rate and operating-rate.

To make the frame rate setting parameters satisfy the requirements of a target frame rate in a real-time communication mode, priority may be set as 0, frame-rate is set to be 60-120, and operating-rate is set to be 120-240, thereby obtaining the plurality of frame rate configuration results corresponding to the frame rate setting parameters.

S320: Configuring decoding hoarded frame parameters according to the parameter configuration rule to obtain a plurality of hoarded frame configuration results.

The decoding hoarded frame parameters include low-latency corresponding to a setInteger interface, low-latency corresponding to a setFeatureEnabled interface, and corresponding parameters of chip vendor private interfaces, such as "vendor.qti- . . . -low-latency.enable", "vendor.h isi- . . . -low-latency-req" and "vendor . . . -low-latency.enable".

To make the decoding hoarded frame parameters solve the problem about low-latency removal of decoder frame hoarding, low-latency corresponding to the setInteger interface may be set as 1, low-latency corresponding to the setFeatureEnabled interface is set to be true, and the corresponding parameters of the chip vendor private interfaces, such as "vendor.qti- . . . -low-latency.enable", "vendor.hisi- . . . -low-latency-req" and "vendor . . . -Low-latency.enable" are set to be 1, thereby obtaining the hoarded frame configuration results corresponding to the decoding hoarded frame parameters.

In the exemplary embodiment, a data basis may be provided for solving the problem about real time of hardware decoding processing by configuring the frame rate setting parameters and the decoding hoarded frame parameters according to the parameter configuration rule to obtain the corresponding plurality of frame rate configuration results and hoarded frame configuration results.

After the plurality of configuration results of the decoding parameters are obtained, compatibility logic configuration may be performed on the decoding parameters, namely, at least two compatibility grades are set, and the different compatibility grades are different in decoder compatibility. In other words, the different compatibility grades are different in compatibility for a decoder (such as a decoding chip).

Figure 4:
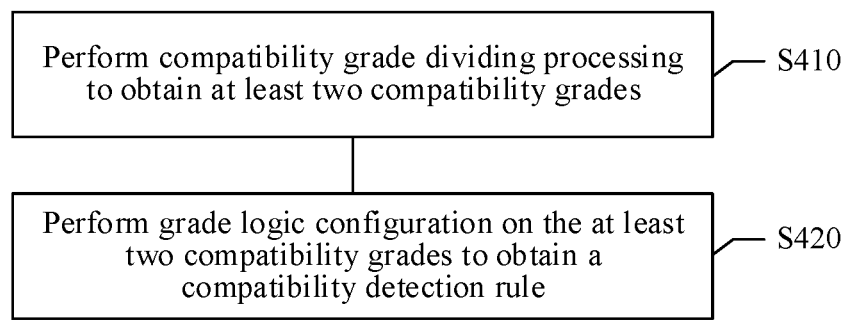
FIG. 4 schematically illustrates a step flowchart of a compatibility logic configuration method according to certain embodiment(s) of the present disclosure.

In some embodiments, FIG. 4 illustrates a step flowchart of a compatibility grade configuration method. As shown in FIG. 4, the method at least may include the following steps: S410: Performing compatibility grade division processing to obtain at least two compatibility grades.

In certain embodiment(s), 5 compatibility grades may be divided and include Ultimate, UltraFast, Fast, LowLatency and Normal. Decoding parameters may be configured according to the 5 compatibility grades in a subsequent process. In addition, compatibility grades different in number may be divided or the compatibility grades may be divided in other manners according to practical situations and demands, which is not specially limited by the exemplary embodiment.

S420: Performing grade logic configuration on at least two compatibility grades to obtain a compatibility detection rule.

Figure 5:
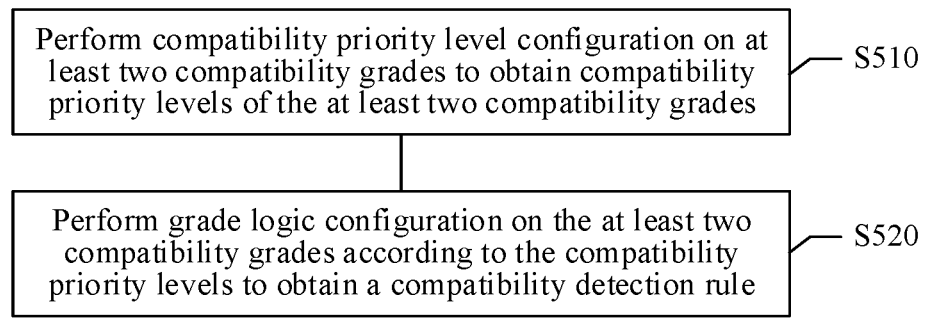
FIG. 5 schematically illustrates a step flowchart of a grade logic configuration method according to certain embodiment(s) of the present disclosure.

In some embodiments, FIG. 5 illustrates a step flowchart of a grade logic configuration method. As shown in FIG. 5, the method at least may include the following steps: S510: Performing priority level configuration on at least two compatibility grades to obtain priority levels of the at least two compatibility grades.

An Ultimate level is set to have the best decoding capability and can bring the extreme decoding capability of decoders such as a decoding chip into play, and thus, the priority level is the highest; an UltraFast level, a Fast level and a LowLatency level are set to make choices for decoding parameters to adapt to the compatibility problem of a terminal with different decoders, thus, the UltraFast level, the Fast level and the LowLatency level may be set to the same in priority level but be lower than the Ultimate level in priority level, the priority level of the UltraFast level may be set to be lower than that of the Ultimate level, the priority level of the Fast level is lower than that of the UltraFast level, and the priority level of the LowLatency level is lower than that of the Fast level; and a Normal level is weakest in decoding capability but best in compatibility and may serve as a minimum guaranteed compatibility grade, and thus, the priority level of the Normal level is the lowest.

In addition, priority levels of other compatibility grades may be set according to practical situations and demands, which is not specially limited by the exemplary embodiment.

S520: Performing grade logic configuration on the at least two compatibility grades according to the priority levels to obtain a compatibility detection rule.

Grade logic configuration may be performed on the at least two compatibility grades after the compatibility grades and the corresponding priority levels are determined.

In certain embodiment(s), the compatibility detection rule obtained by grade logic configuration may firstly select the Ultimate level to determine whether the decoder is applicable or not. When the decoder is not applicable to the Ultimate level, the UltraFast level is secondly selected to determine whether the decoder is applicable or not. When the decoder is not applicable to the Ultimate level and the UltraFast level, the Fast level is thirdly selected to determine whether the decoder is applicable or not. When the decoder is not applicable to the Ultimate level, the UltraFast level and the Fast level, the LowLatency level is fourthly selected to determine whether the decoder is applicable or not. When the decoder is not applicable to the Ultimate level, the UltraFast level, the Fast level and the LowLatency level, the Normal level is finally selected to be applicable to the decoder.

In the exemplary embodiment, the compatibility detection rule is obtained by performing compatibility logic configuration on the decoding parameters to provide a decoding logic for later adopting the decoders for hardware decoding processing, and compatibility of different decoders is brought into play under the situation that the optimal decoding property of the decoders is brought into full play.

S230: Obtaining at least two compatibility grade configurations according to parameter grade matched processing of the at least two compatibility grades and a plurality of configuration results, and selecting one compatibility grade configuration from the at least two compatibility grade configurations.

In the exemplary embodiments of the present disclosure, since the at least two compatibility grades are determined, and to further determine a corresponding relation between the different compatibility grades and the parameter configuration results, parameter grade matched processing may be performed on the at least two compatibility grades and the plurality of configuration results.

Figure 6:
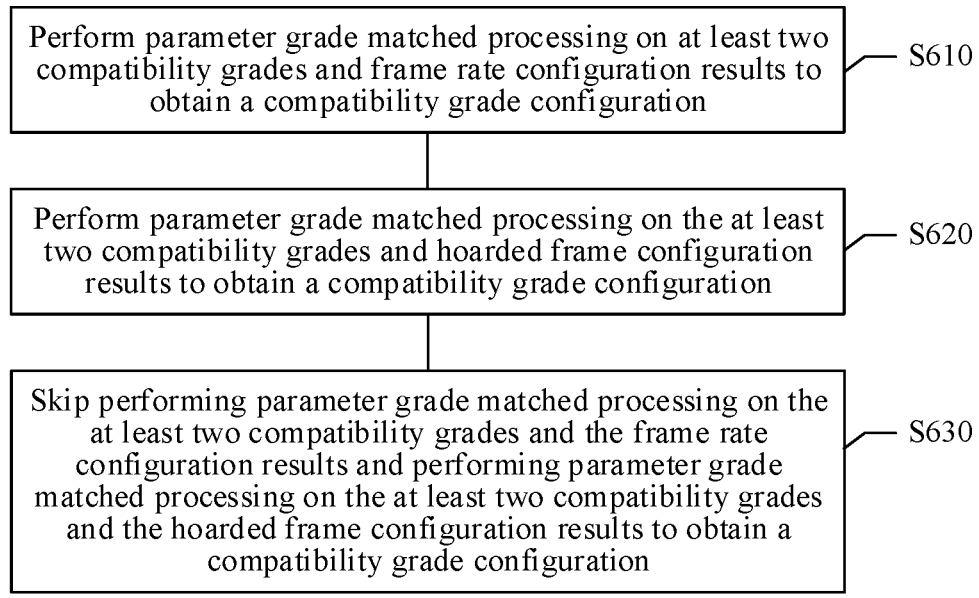
FIG. 6 schematically illustrates a step flowchart of a parameter grade matched processing method according to certain embodiment(s) of the present disclosure.

In some embodiments, FIG. 6 illustrates a step flowchart of a parameter grade matched processing method. As shown in FIG. 6, the method at least may include the following steps: S610: Performing parameter grade matched processing on at least two compatibility grades and a plurality of frame rate configuration results to obtain a first compatibility grade configuration.

The compatibility grades performing parameter grade matched processing with the plurality of frame rate configuration results may be an Ultimate level and an UltraFast level.

In some embodiments, a plurality of frame rate configuration results may include: a first frame rate configuration result in which frame rate setting parameters are set according to the maximum value; and a second frame rate configuration result in which frame rate setting parameters are set according to the minimum value. In certain embodiment(s), in the Ultimate level, to-be-configured frame rate setting parameters include priority, frame-rate and operating-rate. The first frame rate configuration result is matched with the Ultimate level, namely, frame-rate and operating-rate are configured according to the maximum value. Frame-rate is set as 120, and operating-rate is set as 240.

In the UltraFast level, to-be-configured frame rate setting parameters may also include priority, frame-rate and operating-rate. The second frame rate configuration result is matched with the UltraFast grade, namely, frame-rate and operating-rate are configured according to the minimum value. Frame-rate is set as 60, and operating-rate is set as 120.

S620: Performing parameter grade matched processing on the at least two compatibility grades and a plurality of hoarded frame configuration results to obtain a second compatibility grade configuration.

The compatibility grades performing parameter grade matched processing with the hoarded frame configuration results may be a Fast level and a LowLatency level.

In certain embodiment(s), in the Fast level, a matched hoarded frame configuration result includes: low-latency corresponding to a setInteger interface is set as 1, low-latency corresponding to a setFeatureEnabled interface is set to be true, and corresponding parameters of chip vendor private interfaces, such as "vendor.qti- . . . -low-latency.enable", "vendor.hisi- . . . -low-latency-req" and "vendor . . . -low-latency.enable" are set as 1.

In the LowLatency level, a matched hoarded frame configuration result includes: low-latency corresponding to the setInteger interface is set as 1, and low-latency corresponding to the setFeatureEnabled interface is set to be true.

S630: Performing parameter grade matched processing on the at least two compatibility grades and a default configuration result to obtain a third compatibility grade configuration.

A third compatibility grade performing parameter grade matched processing with the default configuration result instead of the frame rate configuration results and the hoarded frame configuration results may be a Normal level. Namely, the Normal level may not configure any decoding parameter and may guarantee that the decoders can normally output decoding results.

In the exemplary embodiment, the corresponding compatibility grade configurations may be obtained by performing parameter grade matched processing on the compatibility grades and the parameter configuration results, thereby providing a parameter basis for the decoders for performing hardware decoding processing according to the compatibility grades and guaranteeing the low-latency decoding capability of the decoders.

Furthermore, grade configuration selecting processing may be performed on the at least two compatibility grade configurations to determine one compatibility grade configuration from the at least two compatibility grade configurations.

In some embodiments, grade configuration selecting processing is performed on at least two compatibility grade configurations according to the priority levels to determine one compatibility grade configuration.

A compatibility detection rule is set according to the priority levels corresponding to the compatibility grades, and thus, when the compatibility grade is selected for configuration for the first time, a corresponding configuration of an Ultimate level may be firstly selected as the determined compatibility configuration. When the compatibility grade is not selected for configuration for the first time, a next compatibility grade configuration of the current compatibility grade configuration may be selected according to the compatibility grade. Whether the next compatibility grade configuration may be selected or may not be decided according to whether a decoder being abnormal is displayed in the current compatibility grade configuration or not.

S240: Configuring and start a decoder according to the compatibility grade configuration, and performing decoding abnormality detection processing on the decoder to obtain an abnormality detection result.

In the exemplary embodiment of the present disclosure, decoding abnormality detection processing may be performed on the decoder under the current compatibility grade configuration to obtain the abnormality detection result. Decoding abnormality detection processing on the decoder may be determined in a process of performing hardware decoding processing on a to-be-decoded video and may also be determined by a front detection means of hardware decoding processing, which is not specially limited by the exemplary embodiment. The abnormality detection result may indicate that a decoder is normal and a decoder is abnormal.

S250: Performing hardware decoding processing on the to-be-decoded video to obtain a decoding processing result according to the compatibility grade configuration if the abnormality detection result indicates that the decoder is normal, and determining that the current compatibility grade configuration is applicable to the decoder if the decoding processing result indicates that decoding is successful.

In the exemplary embodiment of the present disclosure, the abnormality detection result may indicate that a decoder is normal and a decoder is abnormal, and thus, further hardware decoding processing may be performed on the to-be-decoded video according to different abnormality detection results.

In some embodiments, hardware decoding processing is performed on a to-be-decoded video according to a compatibility grade configuration to obtain a decoding processing result if an abnormality detection result indicates that a decoder is normal.

After decoding abnormality detection processing is performed on the decoder according to the compatibility grade configuration, the abnormality detection result indicates that the decoder is normal if a driver layer dose not send any abnormal information. Namely, the decoder is applicable to the current compatibility grade configuration and may further perform hardware decoding processing on the to-be-decoded video.

In addition, an abnormality detection result may also indicate that a decoder is abnormal, and under the situation, the compatibility grade configuration may be replaced with a compatibility grade configuration capable of performing hardware decoding processing.

In some embodiments, if an abnormality detection result indicates that a decoder is abnormal, a next compatibility grade configuration of the compatibility grade configuration is determined from at least two compatibility grade configurations according to the priority levels, and step S240 is repeatedly performed.

After decoding abnormality detection processing is performed on the decoder according to the compatibility grade configuration, a driver layer sends abnormal information indicating that the abnormality detection result indicates the decoder being abnormal, and thus, the decoder is not applicable to the current compatibility grade configuration.

Furthermore, the next compatibility grade configuration of the current compatibility grade configuration is determined according to the priority levels to perform decoding abnormality detection processing till it is determined that an abnormality detection result corresponding to a compatibility grade configuration indicates the decoder being normal, and hardware decoding processing is performed on the to-be-decoded video according to the compatibility grade configuration.

Decoding processing results obtained after hardware decoding processing on the to-be-decoded video may indicate successful decoding and failed decoding, and thus, determination may be performed according to different decoding processing results so that the compatibility grade configuration applicable to the decoder can be determined.

In some embodiments, if a decoding processing result indicates that a first-frame image of a to-be-decoded video is successfully decoded, it is determined that a compatibility grade configuration is applicable to a decoder.

For a terminal device not hoarding frames, when an abnormality detection result indicates that a decoder is normal and the decoding processing result indicates that the first-frame image of the to-be-decoded video is successfully decoded, it indicates that the compatibility configuration is applicable to the decoder nominally, in addition, decoding may succeed in a practical usage process, and thus, the compatibility grade configuration is applicable to the decoder.

In addition, a decoding processing result may indicate that the first-frame image of the to-be-decoded video fails in decoding, and thus, decoding overtime detection processing may be performed on the decoder to determine a compatibility grade configuration applicable to the decoder.

Figure 7:
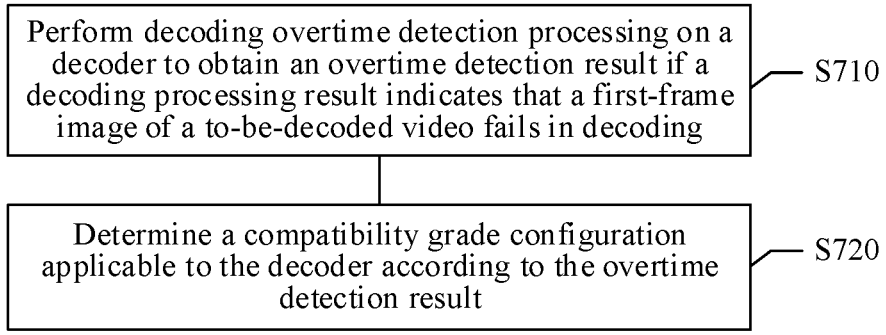
FIG. 7 schematically illustrates a step flowchart of a method according to certain embodiment(s) of the present disclosure.

In some embodiments, FIG. 7 illustrates a step flowchart of a method for determining a compatibility grade configuration applicable to a decoder. As shown in FIG. 7, the method at least may include the following steps: S710: Performing decoding overtime detection processing on the decoder to obtain overtime detection results if a decoding processing result indicates that a first-frame image of a to-be-decoded video fails in decoding.

For example, a MediaCodec being a decoder adopts a hardware decoding processing manner to perform hardware processing on the to-be-decoded video, the decoding processing result indicates that the first-frame image of the to-be-decoded video fails in decoding, and it indicates that the decoding failure result is possibly caused by a compatibility grade configuration. Thus, a decoding overtime detection processing process may be added to determine an applicable compatibility grade configuration.

In certain embodiment(s), during overtime detection processing, a waiting duration threshold may be set, and accordingly, whether a duration of decoding the first-frame image of the to-be-decoded video meets a decoding requirement or not is determined according to the waiting duration threshold. For example, the waiting duration threshold may be 10 ms, 100 ms or 1 s, and may also be set into other values according to practical situations, which is not specially limited by the exemplary embodiment. Thus, the overtime detection results may include waiting overtime and waiting no overtime.

S720: Determining a compatibility grade configuration applicable to the decoder according to the overtime detection result.

In some embodiments, if an overtime detection result indicates waiting overtime, hardware decoding processing is performed on other video frame images except a first-frame image in a to-be-decoded video to determine a compatibility grade configuration applicable to a decoder.

A duration of decoding the first-frame image of the to-be-decoded video being greater than the waiting duration threshold, or being equal to or greater than the waiting duration threshold indicates that the overtime detection result is waiting overtime.

Under the situation, to avoid jamming in a later decoding process of other video frame images, hardware decoding processing may be performed on other video frame images, thereby determining whether the current compatibility grade configuration is applicable to the decoder or not in a later hardware decoding process of other video frame images. Moreover, decoding duration detection processing may be performed in the later process of performing hardware decoding processing on other video frame images, and the compatibility grade configuration may be replaced when the abnormality detection result indicates that the decoder is abnormal. In other words, replacement of the compatibility grade configuration is not limited to the decoding abnormality detection processing process of the first-frame image.

In the process of performing hardware decoding processing on other video frame images, if the first-frame image is successfully decoded, it is determined that the current compatibility grade configuration is applicable to the decoder; and in the process of performing hardware decoding processing on other video frame images, if the first-frame image fails in decoding, a next compatibility grade configuration may be selected for performing processes including decoding abnormality detection processing and hardware decoding processing, thereby determining a compatibility grade configuration applicable to the decoder from the remaining compatibility grade configurations.

In addition, the overtime detection result may indicate waiting no overtime, and thus, secondary decoding abnormality detection processing may be performed to determine a compatibility grade configuration applicable to the decoder.

In some embodiments, if an overtime detection result indicates waiting no overtime, decoding abnormality detection processing is performed on a decoder again according to a compatibility grade configuration to determine the compatibility grade configuration applicable to the decoder.

A duration of decoding a first-frame image of a to-be-decoded video being less than or equal to a waiting duration threshold, or being less than the waiting duration threshold indicates that the overtime detection result is waiting overtime.

Under the situation, it is possible that a frame hoarding terminal device caches a first-frame image hardware decoding processing result in an inner cache area of the decoder, and consequently, the first-frame image hardware decoding processing result indicates successful decoding but cannot be sensed. Thus, to reduce the frame hoarding situation, a secondary decoding abnormality detection processing process may be performed according to the compatibility grade to determine that the first-frame image cannot be successfully decoded when the decoder is normal.

In certain embodiment(s), when the abnormality detection result of secondary decoding abnormality detection processing indicates that the decoder is normal, it indicates that the terminal device has a frame hoarding behavior at the time, and thus it may be determined that the current compatibility grade configuration is applicable to the decoder. When the abnormality detection result of secondary decoding abnormality detection processing indicates that the decoder is abnormal, it indicates that unsuccessful decoding of the first-frame image is caused by abnormality of the decoder, and thus a next compatibility grade may be adopted through replacement to perform later decoding abnormality detection processing and hardware decoding processing to determine a compatibility grade configuration applicable to the decoder.

In the two exemplary embodiments, the compatibility grade configurations applicable to the decoder may be determined according to the different overtime detection results, which cannot jam the later hardware decoding processing process of other video frame images and can determine the compatibility grade configuration under the situation that the frame hoarding behavior is reduced, accuracy is better, and practicability is higher.

The decoder configuration method provided in the embodiment of the present disclosure is described in detail by combining a specific implementation scenario below.

Figure 8:
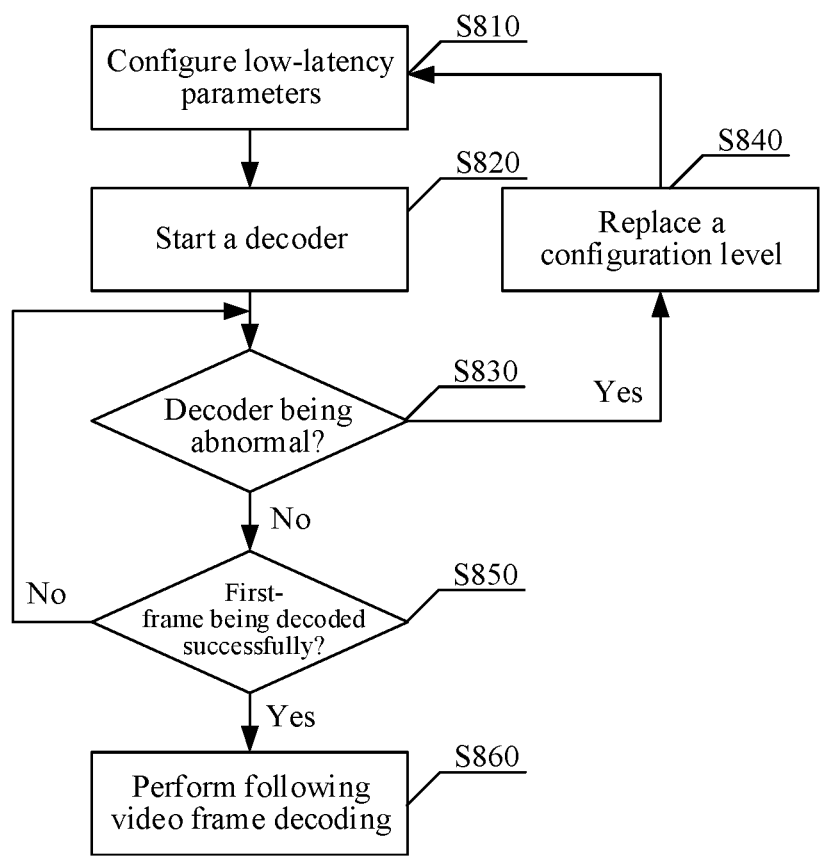
FIG. 8 schematically illustrates a step flowchart of a decoder configuration method according to certain embodiment(s) of the present disclosure.

FIG. 8 illustrates a step flowchart of a decoder configuration method for a terminal device not hoarding frames. As shown in FIG. 8, S810: Configuring low-latency parameters.

Low-latency parameter configuration may mean that rule configuration processing is performed on decoding parameters of a decoder according to a parameter configuration rule.

When the terminal device not hoarding frames uses an Android system, the decoding parameters are configured, by a setInteger interface and a setFeatureEnabled interface, in a MediaFormat according to inputted key values. Common decoding parameters, namely key names may be provided by an Android official document, and in addition, when the decoder is a decoding chip, a chip vendor will expose private key names serving as the decoding parameters.

In certain embodiment(s), refer to Table 1:

TABLE 1

| Parameter set | Interface | Key name | Key value |
|---|---|---|---|
| Real-time communication | setInteger | "priority" | 0 |
| | setInteger | "frame-rate" | 60/120 |
| Low-latency | setInteger | "low-latency" | 1 |
| | setFeatureEnabled | "low-latency" | true |
| Operating frequency | setInteger | "operating-rate" | 120/240 |
| Chip vendor private interface | setInteger | " vendor, qti . . . -low-latency, enable" | 1 |
| | setInteger | "vendor, hi si- . . . -low-latency-req" | 1 |
| | setInteger | "vendor . . . -low-latency.enable" | 1 |
| | setInteger | | |

Decoding parameters corresponding to "real-time communication" are set as priority and frame-rate, configure the decoding chip in a real-time communication mode, and set a target frame rate in the real-time communication mode. Decoding parameters corresponding to "low-latency" configure low-latency to remove hoarded frames of the decoding chip to reach a purpose of rapid frame exporting. Decoding parameters corresponding to "operating frequency" configure operating-rate to adjust the operating frequency in the decoding chip to adapt to a decoding target frame rate. Decoding parameters corresponding to "chip vendor private interface" include private parameters of vendors with current mainstream decoding chips, and through configuration of the private parameters, the decoding chip can run with higher efficiency, the frame hoarding behavior in the decoding chip is closed, and decoding time delay is shortened.

There are many kinds of decoding chips of the Android system, the decoding chips designed by part of chip vendors may only support one or several of decoding parameters in Table 1 and possibly have a compatibility problem for the decoding parameters in Table 1, and thus compatibility detection may be further performed on the decoding parameters.

The decoding parameters in Table 1 may have a certain compatibility problem for the decoding chips produced by the different chip vendors, different Android system versions and video resolutions of different to-be-decoded videos.

For example, when a decoding chip such as MSM8916 sets "frame-rate" as 60, the decoding chip will fail in initialization, and when a video resolution of a to-be-decoded video is 1080p, a decoding chip such as SDM670 sets operating-rate as 240, which causes failed initialization of the decoding chip. Thus, it is desirable to perform compatibility detection on the decoding parameters.

Firstly, compatibility grade division processing is performed on the decoding parameters to obtain 5 compatibility grades including Ultimate, UltraFast, Fast, LowLatency and Normal.

In certain embodiment(s), the Ultimate level belongs to extreme configuration, and all the parameters in Table 1 are configured according to the maximum value in the level. Frame-rate is set as 120, and operating-rate is set as 240.

The UltraFast level belongs to ultrafast configuration, and all the parameters in Table 1 are configured according to the minimum value in the level, at the time, frame-rate is set as 60, and operating-rate is set as 120.

The Fast level belongs to fast configuration, decoding parameters corresponding to "real-time communication" and "operating frequency" in the level are not configured, and only decoding parameters corresponding to "low-latency" and "chip vendor private interface" are configured.

The LowLatency level belongs to low-latency configuration, and only decoding parameters corresponding to "low-latency" are configured in the level.

The Normal level belongs to a comparative configuration, and none of the decoding parameters in Table 1 is configured in the level.

In the five compatibility grades, the Ultimate level has the best decoding capability and can bring the extreme decoding capability of decoders such as decoding chips into play, a decoding frame rate of part of the decoding chips is improved by near 5 times compared with the Normal level, and thus the priority level is the highest; the UltraFast level, the Fast level and the LowLatency level are set to make choices for the decoding parameters to adapt to the compatibility problem of a terminal with different decoders, thus, the UltraFast level, the Fast level and the LowLatency level may be set to the same in priority level but be lower than the Ultimate level in priority level, the priority level of the UltraFast level may be set to be lower than that of the Ultimate level, the priority level of the Fast level is lower than that of the UltraFast level, and the priority level of the LowLatency level is lower than that of the Fast level; and the Normal level is weakest in decoding capability but best in compatibility and may serve as a minimum guaranteed compatibility grade, and thus, it is guaranteed that the decoder may normally perform decoding and output video images.

According to the five compatibility grades, grade logic configuration is sequentially performed according to the priority levels from the Ultimate level to the Normal level to obtain a compatibility detection rule.

In certain embodiment(s), the compatibility detection rule obtained by grade logic configuration may firstly select the Ultimate level to determine whether the decoder is applicable or not. When the decoder is not applicable to the Ultimate level, the UltraFast level is secondly selected to determine whether the decoder is applicable or not. When the decoder is not applicable to the Ultimate level and the UltraFast level, the Fast level is thirdly selected to determine whether the decoder is applicable or not. When the decoder is not applicable to the Ultimate level, the UltraFast level and the Fast level, the LowLatency level is fourthly selected to determine whether the decoder is applicable or not. When the decoder is not applicable to the Ultimate level, the UltraFast level, the Fast level and the LowLatency level, the Normal level is finally selected to be applicable to the decoder.

Furthermore, parameter grade matched processing is performed on the compatibility grade and parameter configuration results in Table 1 to obtain compatibility grade configurations.

In the Ultimate level, to-be-configured frame rate setting parameters include priority, frame-rate and operating-rate. Configuration on frame-rate and operating-rate is performed according to the maximum value. Frame-rate is set as 120, and operating-rate is set as 240.

In the UltraFast level, to-be-configured frame rate setting parameters may also include priority, frame-rate and operating-rate. Configuration on frame-rate and operating-rate is performed according to the minimum value. Frame-rate is set as 60, and operating-rate is set as 120.

In the Fast level, low-latency corresponding to a setInteger interface is set as 1, low-latency corresponding to a setFeatureEnabled interface is set to be true, and corresponding parameters of chip vendor private interfaces, such as "vendor.qti- . . . -low-latency.enable", "vendor.hisi- . . . -low-latency-req" and "vendor . . . -low-latency.enable" are set as 1.

In the LowLatency level, low-latency corresponding to the setInteger interface is set as 1, and low-latency corresponding to the setFeatureEnabled interface is set to be true.

The Normal level may not configure any decoding parameter and may guarantee that the decoders can normally output decoding results.

When one selected compatibility grade succeeds in configuration, the compatibility grade configuration may be recorded as the optimal level of the decoding chip in a low-latency scenario, and later same-resolution to-be-decoded videos are subjected to adaption according to the compatibility grade configuration in the level. However, when the compatibility grade fails in configuration, switching to a next compatibility grade of the compatibility grade is performed for configuration.

A compatibility detection rule is set according to the priority levels corresponding to the compatibility grades, and thus, when the compatibility grade is selected for configuration for the first time, a corresponding configuration of an Ultimate level may be firstly selected as the determined compatibility configuration. When the compatibility grade is not selected for configuration for the first time, a next compatibility grade configuration of the current compatibility grade configuration may be selected according to the compatibility grade. Whether the next compatibility grade configuration may be selected or may not be decided according to whether the decoder being abnormal is displayed in the current compatibility grade configuration or not.

S820: Starting the decoder.

To determine whether the current compatibility grade configuration is adaptive to the decoder or not, the decoder may be started for performing later decoding abnormality detection processing.

S830: Determining whether the decoder is abnormal or not.

A decoder configuration process and a decoder starting process are asynchronous, thus it is undesirable to simply return to determine whether configuration succeeds or not, namely whether the compatibility grade configuration is applicable to the decoder or not, and in other words, the decoder may be determined by performing decoding abnormality detection processing according to the current compatibility grade configuration.

S840: Replacing a configuration level if the decoder is abnormal.

If an abnormality detection result of decoding abnormality detection processing indicates that the decoder is abnormal, a next compatibility grade configuration of the compatibility grade configuration is determined from at least two compatibility grade configurations according to the priority levels, thereby performing hardware decoding processing on a to-be-decoded video to obtain a decoding processing result.

After decoding abnormality detection processing is performed on the decoder according to the compatibility grade configuration, a driver layer sends abnormal information indicating that the abnormality detection result indicates the decoder being abnormal, and thus, the decoder is not applicable to the current compatibility grade configuration.

Furthermore, the next compatibility grade configuration of the current compatibility grade configuration is determined according to the priority levels to perform decoding abnormality detection processing till it is determined that an abnormality detection result corresponding to a compatibility grade configuration indicates the decoder being normal, and hardware decoding processing is performed on the to-be-decoded video according to the compatibility grade configuration.

Decoding processing results obtained after hardware decoding processing on the to-be-decoded video may indicate successful decoding and failed decoding, and thus, determination may be performed according to different decoding processing results so that the compatibility grade configuration applicable to the decoder can be determined.

S850: Determining whether a first frame of the to-be-decoded video is successfully decoded or not.

If the abnormality detection result indicates that the decoder is normal, hardware decoding processing is performed on the to-be-decoded video according to the compatibility grade configuration to obtain a decoding processing result.

After decoding abnormality detection processing is performed on the decoder according to the compatibility grade configuration, the abnormality detection result indicates that the decoder is normal if a driver layer dose not send any abnormal information. Namely, the decoder is applicable to the current compatibility grade configuration and may further perform hardware decoding processing on the to-be-decoded video.

For a machine type not hoarding frames, the decoding processing result can be determined after a first-frame image is outputted. When the first-frame image fails in output, namely, the decoding processing result indicates that the first-frame image of the to-be-decoded video fails in decoding, secondary decoding abnormality detection processing may be performed to determine whether the reason for failed decoding of the first-frame image is the failed compatibility grade configuration or not.

S860: Decoding following video frames.

For the machine type not hoarding frames, when the decoding processing result indicates that the first-frame image is outputted, it indicates that the first-frame image succeeds in decoding, and thus the compatibility grade configuration is adaptive to the decoder and may be utilized for performing hardware decoding processing on other video frame images except the first-frame image of the to-be-decoded video.

Figure 9:
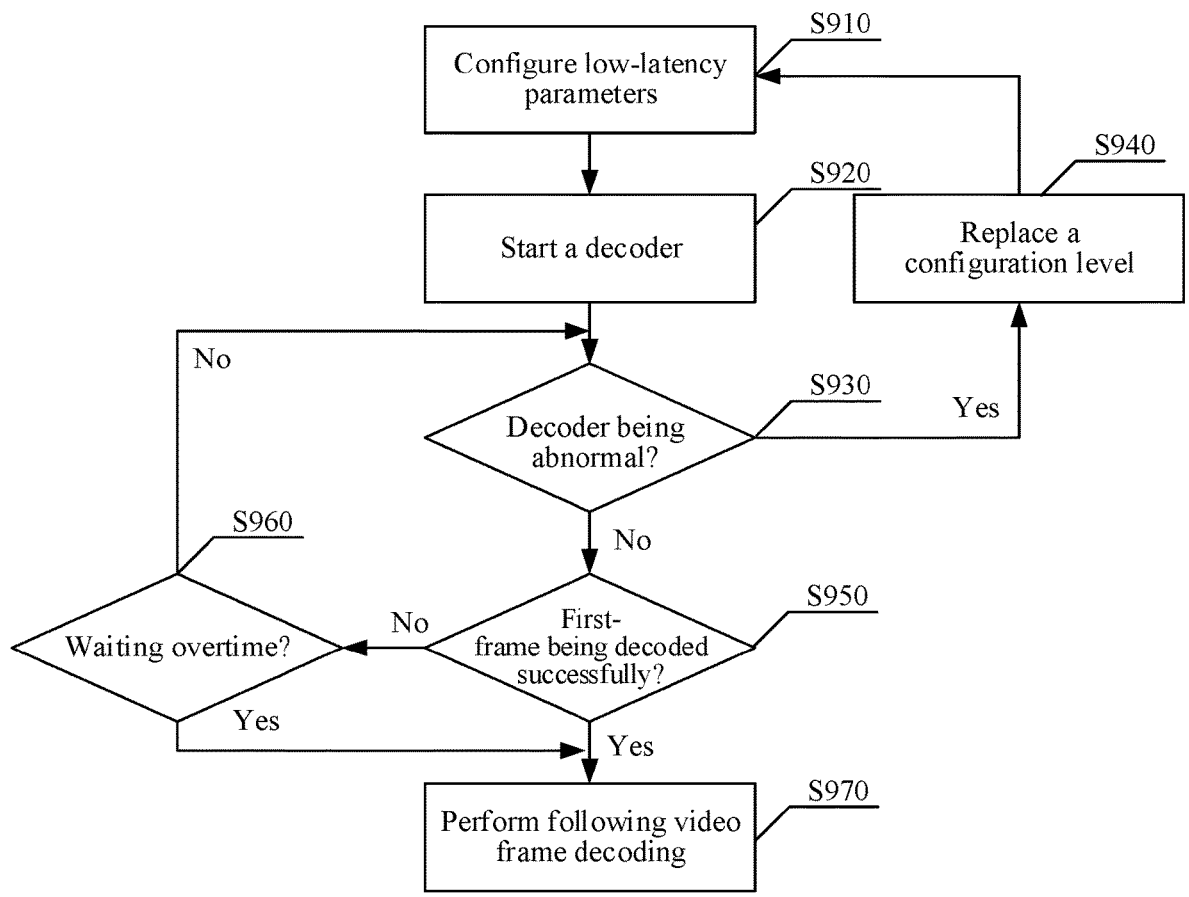
FIG. 9 schematically illustrates a step flowchart of a decoder configuration method according to certain embodiment(s) of the present disclosure.

FIG. 9 illustrates a step flowchart of a decoder configuration method for a terminal device hoarding frames. As shown in FIG. 9, S910: Configuring low-latency parameters.

Low-latency parameter configuration may mean that rule configuration processing is performed on decoding parameters of a decoder according to a parameter configuration rule.

When a terminal device not hoarding frames uses an Android system, the decoding parameters are configured, by a setInteger interface and a setFeatureEnabled interface, in a MediaFormat according to inputted key values. Common decoding parameters, namely key names may be provided by an Android official document, and in addition, when the decoder is a decoding chip, a chip vendor will expose private key names serving as the decoding parameters.

In certain embodiment(s), refer to decoding parameters shown in Table 1. Decoding parameters corresponding to "real-time communication" configure the decoding chip in a real-time communication mode by setting priority and frame-rate, and set a target frame rate in the real-time communication mode. Decoding parameters corresponding to "low-latency" configure low-latency to remove hoarded frames of the decoding chip to reach a purpose of rapid frame exporting. Decoding parameters corresponding to "operating frequency" configure operating-rate to adjust the operating frequency in the decoding chip to adapt to a decoding target frame rate. Decoding parameters corresponding to "chip vendor private interface" include private parameters of vendors with current mainstream decoding chips, and through configuration of the private parameters, the decoding chip can run with higher efficiency, the frame hoarding behavior in the decoding chip is closed, and decoding time delay is shortened.

There are many kinds of decoding chips of the Android system, the decoding chips designed by part of chip vendors may only support one or several of decoding parameters in Table 1 and possibly have a compatibility problem for the decoding parameters in Table 1, and thus compatibility detection may be further performed on the decoding parameters.

The decoding parameters in Table 1 may have a certain compatibility problem for the decoding chips produced by the different chip vendors, different Android system versions and video resolutions of different to-be-decoded videos.

For example, when a decoding chip such as MSM8916 sets "frame-rate" as 60, the decoding chip will fail in initialization, and when a video resolution of a to-be-decoded video is 1080p, a decoding chip such as SDM670 sets operating-rate as 240, which causes failed initialization of the decoding chip. Thus, it is desirable to perform compatibility detection on the decoding parameters.

Firstly, compatibility grade division processing is performed on the decoding parameters to obtain 5 compatibility grades including Ultimate, UltraFast, Fast, LowLatency and Normal.

In certain embodiment(s), the Ultimate level belongs to extreme configuration, and all the parameters in Table 1 are configured according to the maximum value in the level. Frame-rate is set as 120, and operating-rate is set as 240.

The UltraFast level belongs to ultrafast configuration, and all the parameters in Table 1 are configured according to the minimum value in the level, at the time, frame-rate is set as 60, and operating-rate is set as 120.

The Fast level belongs to fast configuration, decoding parameters corresponding to "real-time communication" and "operating frequency" in the level are not configured, and only decoding parameters corresponding to "low-latency" and "chip vendor private interface" are configured.

The LowLatency level belongs to low-latency configuration, and only decoding parameters corresponding to "low-latency" are configured in the level.

The Normal level belongs to a comparative configuration, and none of the decoding parameters in Table 1 is configured in the level.

In the five compatibility grades, the Ultimate level has the best decoding capability and can bring the extreme decoding capability of decoders such as decoding chips into play, a decoding frame rate of part of the decoding chips is improved by near 5 times compared with the Normal level, and thus the priority level is the highest; the UltraFast level, the Fast level and the LowLatency level are set to make choices for the decoding parameters to adapt to the compatibility problem of a terminal with different decoders, thus, the UltraFast level, the Fast level and the LowLatency level may be set to the same in priority level but be lower than the Ultimate level in priority level, the priority level of the UltraFast level may be set to be lower than that of the Ultimate level, the priority level of the Fast level is lower than that of the UltraFast level, and the priority level of the LowLatency level is lower than that of the Fast level; and the Normal level is weakest in decoding capability but best in compatibility and may serve as a minimum guaranteed compatibility grade, and thus, it is guaranteed that the decoder may normally perform decoding and output video images.

According to the five compatibility grades, grade logic configuration is sequentially performed according to the priority levels from the Ultimate level to the Normal level to obtain a compatibility detection rule.

In certain embodiment(s), the compatibility detection rule obtained by grade logic configuration may firstly select the Ultimate level to determine whether the decoder is applicable or not. When the decoder is not applicable to the Ultimate level, the UltraFast level is secondly selected to determine whether the decoder is applicable or not. When the decoder is not applicable to the Ultimate level and the UltraFast level, the Fast level is thirdly selected to determine whether the decoder is applicable or not. When the decoder is not applicable to the Ultimate level, the UltraFast level and the Fast level, the LowLatency level is fourthly selected to determine whether the decoder is applicable or not. When the decoder is not applicable to the Ultimate level, the UltraFast level, the Fast level and the LowLatency level, the Normal level is finally selected to be applicable to the decoder.

Furthermore, parameter grade matched processing is performed on the compatibility grade and parameter configuration results in Table 1 to obtain compatibility grade configurations.

In the Ultimate level, to-be-configured frame rate setting parameters include priority, frame-rate and operating-rate. Configuration on frame-rate and operating-rate is performed according to the maximum value. Frame-rate is set as 120, and operating-rate is set as 240.

In the UltraFast level, to-be-configured frame rate setting parameters may also include priority, frame-rate and operating-rate. Configuration on frame-rate and operating-rate is performed according to the minimum value. Frame-rate is set as 60, and operating-rate is set as 120.

In the Fast level, low-latency corresponding to a setInteger interface is set as 1, low-latency corresponding to a setFeatureEnabled interface is set to be true, and corresponding parameters of chip vendor private interfaces, such as "vendor.qti- . . . -low-latency.enable", "vendor.hisi- . . . -low-latency-req" and "vendor . . . -low-latency-.enable" are set as 1.

In the LowLatency level, low-latency corresponding to the setInteger interface is set as 1, and low-latency corresponding to the setFeatureEnabled interface is set to be true.

The Normal level may not configure any decoding parameter and may guarantee that the decoders can normally output decoding results.

When one selected compatibility grade succeeds in configuration, the compatibility grade configuration may be recorded as the optimal level of the decoding chip in a low-latency scenario, and later same-resolution to-be-decoded videos are subjected to adaption according to the compatibility grade configuration in the level. However, when the compatibility grade fails in configuration, switching to a next compatibility grade of the compatibility grade is performed for configuration.

A compatibility detection rule is set according to the priority levels corresponding to the compatibility grades, and thus, when the compatibility grade is selected for configuration for the first time, a corresponding configuration of an Ultimate level may be firstly selected as the determined compatibility configuration. When the compatibility grade is not selected for configuration for the first time, a next compatibility grade configuration of the current compatibility grade configuration may be selected according to the compatibility grade. Whether the next compatibility grade configuration may be selected or may not be decided according to whether a decoder being abnormal is displayed in the current compatibility grade configuration or not.

S920: Starting the decoder.

To determine whether the current compatibility grade configuration is adaptive to the decoder or not, the decoder may be started for performing later decoding abnormality detection processing.

S930: Determining whether the decoder is abnormal or not.

A decoder configuration process and a decoder starting process are asynchronous, thus it is undesirable to simply return to determine whether configuration succeeds or not, namely whether the compatibility grade configuration is applicable to the decoder or not, and in other words, the decoder may be determined by performing decoding abnormality detection processing according to the current compatibility grade configuration.

S940: Replacing a configuration level.

If an abnormality detection result of decoding abnormality detection processing indicates that the decoder is abnormal, a next compatibility grade configuration of the compatibility grade configuration is determined from at least two compatibility grade configurations according to the priority levels, thereby performing hardware decoding processing on the to-be-decoded video to obtain a decoding processing result.

After decoding abnormality detection processing is performed on the decoder according to the compatibility grade configuration, a driver layer sends an abnormality information indicating that the abnormality detection result indicates the decoder being abnormal, and thus, the decoder is not applicable to the current compatibility grade configuration.

Furthermore, the next compatibility grade configuration of the current compatibility grade configuration is determined according to the priority levels to perform decoding abnormality detection processing till it is determined that an abnormality detection result corresponding to a compatibility grade configuration indicates the decoder being normal, and hardware decoding processing is performed on the to-be-decoded video according to the compatibility grade configuration.

Decoding processing results obtained after hardware decoding processing on the to-be-decoded video may indicate successful decoding and failed decoding, and thus, determination may be performed according to different decoding processing results so that the compatibility grade configuration applicable to the decoder can be determined.

S950: Determining whether a first frame of the to-be-decoded video is successfully decoded or not.

For the terminal device hoarding frames, decoded images can be outputted as long as a specific number of video frames are inputted. For example, for a terminal device hoarding 3 frames, a $1^{st}$-frame video frame can be outputted after a $4^{th}$-frame video frame is inputted. The problem of frame hoarding can be solved according to the decoder configuration method shown in FIG. 8, namely, the frame hoarding behavior in the decoding chip is closed.

Thus, determination on whether hardware decoding processing on the first-frame image of the frame-hoarding machine type succeeds or not may be determined according to a decoding processing result about whether the first-frame image is outputted or not.

S960: Determining whether waiting is overtime or not if decoding fails.

For decoding chips produced by some small vendors and old-generation decoding chips, the problem of frame hoarding cannot be solved by the decoder configuration method shown in FIG. 8. Thus, a waiting duration threshold may be set to perform decoding overtime detection processing on the decoder to prevent jamming of the following hardware decoding process of other video frame images in the detection process.

If an overtime detection result indicates waiting no overtime, decoding abnormality detection processing is performed on the decoder again according to a compatibility grade configuration to determine the compatibility grade configuration applicable to the decoder.

A duration of decoding the first-frame image of the to-be-decoded video being less than or equal to the waiting duration threshold, or being less than the waiting duration threshold indicates that the overtime detection result is waiting overtime.

Under the situation, it is possible that the frame hoarding terminal device caches a first-frame image hardware decoding processing result in an inner cache area of the decoder, and consequently, the first-frame image hardware decoding processing result indicates successful decoding but cannot be sensed. Thus, to reduce the frame hoarding situation, a secondary decoding abnormality detection processing process may be performed according to the compatibility grade to determine that the first-frame image cannot be successfully decoded when the decoder is normal.

In certain embodiment(s), when the abnormality detection result of secondary decoding abnormality detection processing indicates that the decoder is normal, it indicates that the terminal device has a frame hoarding behavior at the time, and thus it may be determined that the current compatibility grade configuration is applicable to the decoder. When the abnormality detection result of secondary decoding abnormality detection processing indicates that the decoder is abnormal, it indicates that unsuccessful decoding of the first-frame image is caused by abnormality of the decoder, and thus a next compatibility grade may be adopted through replacement to perform later decoding abnormality detection processing and hardware decoding processing to determine a compatibility grade configuration applicable to the decoder.

S970: Decoding following video frames.

If the overtime detection result indicates waiting overtime, hardware decoding processing is performed on other video frame images except the first-frame image in the to-be-decoded video to determine a compatibility grade configuration applicable to the decoder.

A duration of decoding the first-frame image of the to-be-decoded video being greater than the waiting duration threshold, or being equal to or greater than the waiting duration threshold indicates that the overtime detection result is waiting overtime.

Under the situation, to avoid jamming in a later decoding process of other video frame images, hardware decoding processing may be performed on other video frame images, thereby determining whether the current compatibility grade configuration is applicable to the decoder or not in a later hardware decoding process of other video frame images. Moreover, decoding duration detection processing may be performed in the later process of performing hardware decoding processing on other video frame images, and the compatibility grade configuration may be replaced when the abnormality detection result indicates that the decoder is abnormal. In other words, replacement of the compatibility grade configuration is not limited to the decoding abnormality detection processing process of the first-frame image.

In the process of performing hardware decoding processing on other video frame images, if the first-frame image is successfully decoded, it is determined that the current compatibility grade configuration is applicable to the decoder; and in the process of performing hardware decoding processing on other video frame images, if the first-frame image fails in decoding, a next compatibility grade configuration may be selected for performing processes including decoding abnormality detection processing and hardware decoding processing, thereby determining a compatibility grade configuration applicable to the decoder from the remaining compatibility grade configurations.

It can be known from the above implementation scenario that the decoder configuration method provided by the embodiments of the present disclosure, on one hand, performs rule configuration processing on the decoding parameters, solves the problem about decoding frame hoarding of the decoder and the problem about time delay in the decoder hardware decoding processing process, achieves a higher decoding frame rate and an effect of rapid hardware decoding and frame exporting, and satisfies the requirements of the low-latency video service scenario; and on the other hand, compatibility logic configuration and parameter grade matched processing are performed on the decoding parameters to obtain the compatibility grade configurations, thereby solving the problem about compatibility of different decoders, and bringing the optimal decoding property of the decoders into play.

Although the steps of the method in the present disclosure are described in a specific order in the accompanying drawings, this does not require or imply that the steps have to be performed in the specific order, or all the steps shown have to be performed to achieve an expected result. Additionally or alternatively, some steps may be omitted, a plurality of steps may be combined into one step, and/or one step may be decomposed into a plurality of steps for execution, and the like.

The following describes apparatus embodiments of the present disclosure, and the apparatus embodiments may be used for performing the decoder configuration method in the embodiment of the present disclosure. For details not disclosed in the apparatus embodiments of the present disclosure, reference may be made to the decoder configuration method in the embodiments of the present disclosure.

Figure 10A:
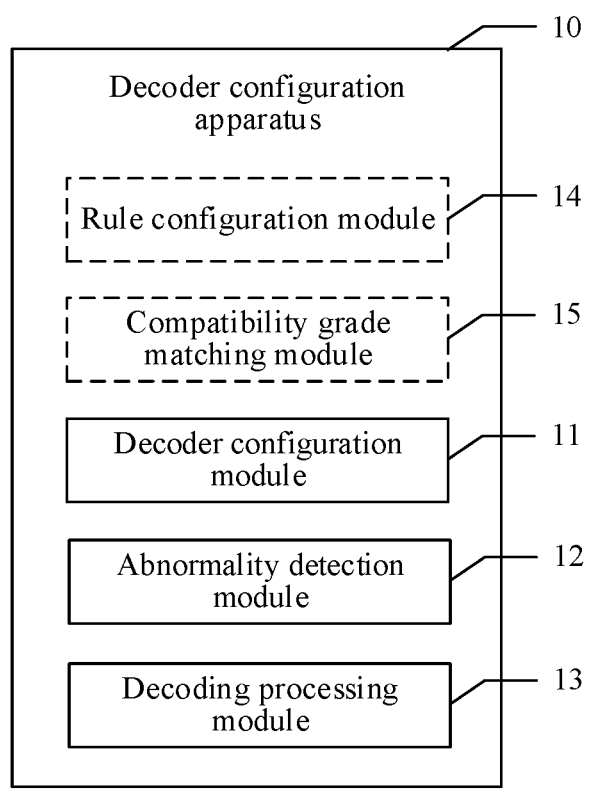
FIG. 10A-10B schematically illustrate a structure block diagram of a decoder configuration apparatus according to certain embodiment(s) of the present disclosure.

FIG. 10A illustrates a schematic structural diagram of a decoder configuration apparatus in some embodiments of the present disclosure. As shown in FIG. 10A, the apparatus 10 includes: a decoder configuration module 11 configured to acquire at least two compatibility grade configurations used for configuring decoding parameters of a decoder, where the different compatibility grade configurations being different in priority level, decoding property and decoder compatibility; sequentially select one compatibility grade configuration from the compatibility grade configurations according to the priority levels from high to low; and specific to the current selected compatibility grade configuration: configure the decoder according to the compatibility grade configuration and start the decoder; an abnormality detection module 12 configured to perform decoding abnormality detection processing on the decoder to obtain an abnormality detection result; and a decoding processing module 13 configured to perform hardware decoding processing on a to-be-decoded video according to the current selected compatibility grade configuration to obtain a decoding processing result if the abnormality detection result indicates that the decoder is normal, and determine that the current compatibility grade configuration is applicable to the decoder if the decoding processing result indicates that decoding is successful.

In some embodiments, the apparatus 10 further includes: a rule configuration module 14 configured to acquire decoding parameters of a decoder and determine a parameter configuration rule corresponding to a decoding demand; and configure the decoding parameters according to the parameter configuration rule to obtain a plurality of configuration results of the decoding parameters, different configuration results corresponding to different decoding properties; and a compatibility grade configuration module 15 configured to set at least two compatibility grades according to the decoding parameters, the different compatibility grades being different in decoder compatibility; and obtain at least two compatibility grade configurations according to parameter grade matched processing of the at least two compatibility grades and the plurality of configuration results.

In some embodiments, decoding parameters include frame rate setting parameters and decoding hoarded frame parameters, and configuration results include frame rate configuration results, hoarded frame configuration results and a default configuration result in which no configuration is performed on the decoding parameters; and the rule configuration module 14 is further configured to: configure the frame rate setting parameters according to a parameter configuration rule to obtain the plurality of frame rate configuration results; and configure the decoding hoarded frame parameters according to the parameter configuration rule to obtain the plurality of hoarded frame configuration results.

In some embodiments, the compatibility grade configuration module 15 is further configured to: perform parameter grade matched processing on at least two compatibility grades and a plurality of frame rate configuration results to obtain a first compatibility grade configuration; and perform parameter grade matched processing on the at least two compatibility grades and the plurality of hoarded frame configuration results to obtain a second compatibility grade configuration; and perform parameter grade matched processing on the at least two compatibility grades and a default configuration result to obtain a third compatibility grade configuration.

In some embodiments, the compatibility grade configuration module 15 is further configured to: perform priority level configuration on the at least two compatibility grades to obtain priority levels of the at least two compatibility grades.

In some embodiments, the decoding processing module 13 is further configured to: trigger a decoder configuration module 11 to determine a next compatibility grade configuration of the current compatibility grade configuration from at least two compatibility grade configurations according to the priority levels if an abnormality detection result indicates that a decoder is abnormal, configure the decoder again according to the compatibility grade configuration, restart the decoder, and trigger an abnormality detection module 12 to perform decoding abnormality detection processing on the decoder again.

In some embodiments, the decoding processing module 13 is further configured to: determine that a decoding processing result indicates successful decoding if a first-frame image of a to-be-decoded video is successfully decoded and outputted from a decoder.

In some embodiments, the decoding processing module 13 is further configured to: trigger a decoder configuration module 11 to determine a next compatibility grade configuration of the current compatibility grade configuration from at least two compatibility grade configurations according to the priority levels if a decoding processing result indicates that decoding fails, configure a decoder again according to the compatibility grade configuration, restart the decoder, and trigger an abnormality detection module 12 to perform decoding abnormality detection processing on the decoder again.

In some embodiments, the decoding processing module 13 is further configured to: perform decoding overtime detection processing on a decoder to obtain an overtime detection result if a decoding processing result indicates that decoding fails; and perform decoding processing on other video frame images except a first-frame image in a to-be-decoded video if the overtime detection result indicates waiting overtime, and determine whether the current compatibility grade configuration is applicable to the decoder or not in the decoding process of other video frame images.

In some embodiments, the decoding processing module 13 is further configured to: determine whether a decoding duration of a first-frame image of a to-be-decoded video is greater than a duration threshold or not according to the preset duration threshold; and determine that an overtime detection result is waiting overtime if the decoding duration is greater than or equal to or greater than the duration threshold.

Figure 10B:
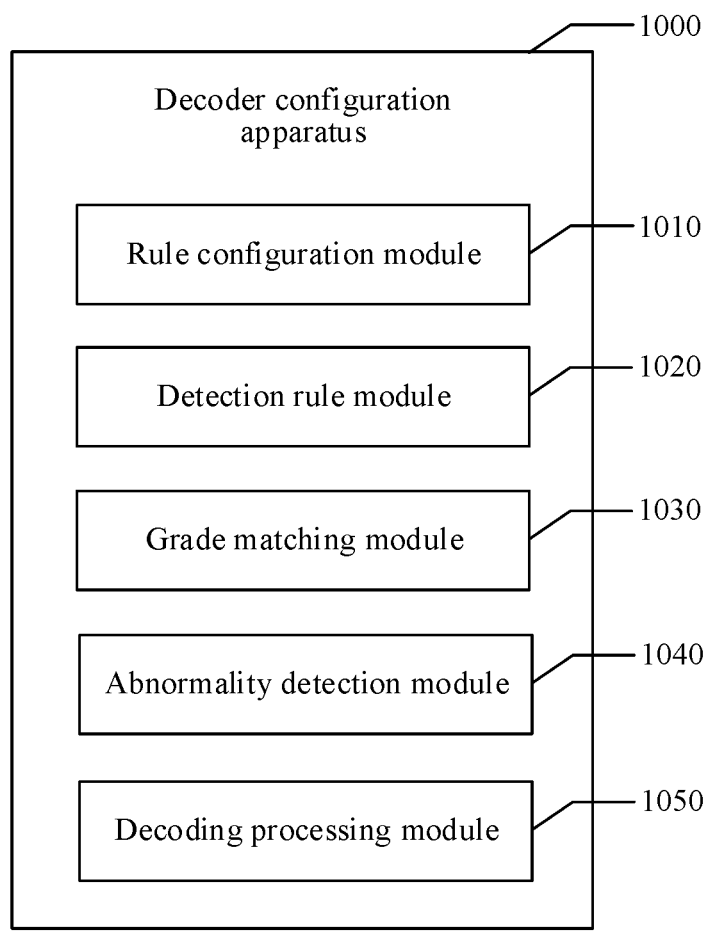

FIG. 10B schematically illustrates a structure block diagram of a decoder configuration apparatus in some embodiments of the present disclosure. As shown in FIG. 10B, the decoder configuration apparatus 1000 may include: a rule configuration module 1010, a detection rule module 1020, a grade matching module 1030, an abnormality detection module 1040 and a decoding processing module 1050.

The rule configuration module 1010 is configured to acquire decoding parameters of a decoder and a to-be-decoded video corresponding to the decoder, and determine a parameter configuration rule corresponding to the decoding parameters; the detection rule module 1020 is configured to perform rule configuration processing on the decoding parameters according to the parameter configuration rule to obtain parameter configuration results and perform compatibility logic configuration on the decoding parameters to obtain a compatibility detection rule including at least two compatibility grades; the grade matching module 1030 is configured to perform parameter grade matched processing on the at least two compatibility grades and parameter configuration results to obtain at least two compatibility grade configurations, and perform grade configuration selecting processing on the at least two compatibility grade configurations to determine one compatibility grade configuration; the abnormality detection module 1040 is configured to perform decoding abnormality detection processing on the decoder according to the compatibility grade configuration to obtain an abnormality detection result; and the decoding processing module 1050 is configured to perform hardware decoding processing on the to-be-decoded video according to the abnormality detection result, and determine the compatibility grade configuration applicable to the decoder according to the decoding processing result.

In some embodiments of the present disclosure, the detection rule module 1020 includes: a frame rate setting submodule configured to perform rule configuration processing on frame rate setting parameters according to a parameter configuration rule to obtain frame rate configuration results; and a frame hoarding setting submodule configured to perform rule configuration processing on decoding hoarded frame parameters according to the parameter configuration rule to obtain hoarded frame configuration results.

In some embodiments of the present disclosure, the grade matching module 1030 includes: a frame rate matching submodule configured to perform parameter grade matched processing on at least two compatibility grades and frame rate configuration results to obtain a compatibility grade configuration; and a frame hoarding matching submodule configured to perform parameter grade matched processing on the at least two compatibility grades and hoarded frame configuration results to obtain a compatibility grade configuration; and a mismatching submodule configured not to perform parameter grade matched processing on the at least two compatibility grades and the frame rate configuration results and not to perform parameter grade matched processing on the at least two compatibility grades and the hoarded frame configuration results to obtain a compatibility grade configuration.

In some embodiments of the present disclosure, the detection rule module 1020 includes: a grade division submodule configured to perform compatibility grade division processing on decoding parameters to obtain at least two compatibility grades; and a logic configuration submodule configured to perform grade logic configuration on the at least two compatibility grades to obtain a compatibility detection rule.

In some embodiments of the present disclosure, the logic configuration submodule includes: a grade configuration unit configured to perform priority level configuration on at least two compatibility grades to obtain priority levels of the at least two compatibility grades; and a grade assigning unit configured to perform grade logic configuration on the at least two compatibility grades according to the priority levels to obtain a compatibility detection rule.

In some embodiments of the present disclosure, the grade matching module 1030 includes: a configuration selecting submodule configured to perform grade configuration selecting processing on at least two compatibility grade configurations according to the priority levels to determine one compatibility grade configuration.

In some embodiments of the present disclosure, the decoding processing module 1050 includes: a result abnormality submodule configured to determine a next compatibility grade configuration of a compatibility grade configuration from at least two compatibility grade configurations according to the priority levels if an abnormality detection result indicates a decoder being abnormal, thereby performing hardware decoding processing on a to-be-decoded video to obtain a decoding processing result.

In some embodiments of the present disclosure, the decoding processing module 1050 includes: a normal decoding submodule configured to perform hardware decoding processing on a to-be-decoded video according to a compatibility grade configuration to obtain a decoding processing result if an abnormality detection result indicates a decoder being normal.

In some embodiments of the present disclosure, the decoding processing module 1050 includes: a successful decoding submodule configured to determine a compatibility grade configuration being applicable to a decoder if a decoding processing result indicates that a first-frame image of a to-be-decoded video is successfully decoded.

In some embodiments of the present disclosure, the decoding processing module 1050 includes: a failed decoding submodule configured to perform decoding overtime detection processing on a decoder to obtain an overtime detection result if a decoding processing result indicates that a first-frame image of a to-be-decoded video fails in decoding; and a detection result submodule configured to determine a compatibility grade configuration applicable to the decoder according to the overtime detection result.

In some embodiments of the present disclosure, the detection result submodule includes: a waiting overtime unit configured to perform hardware decoding processing on other video frame images except a first-frame image in a to-be-decoded video to determine a compatibility grade configuration applicable to a decoder if an overtime detection result indicates waiting overtime.

In some embodiments of the present disclosure, the detection result submodule includes: a normal duration unit configured to perform decoding abnormality detection processing on a decoder again according to a compatibility grade configuration to determine the compatibility grade configuration applicable to the decoder if an overtime detection result indicates waiting no overtime.

Concrete details of the decoder configuration apparatus provided in various embodiments of the present disclosure are described in detail in corresponding method embodiments, which are not repeated herein.

Figure 11:
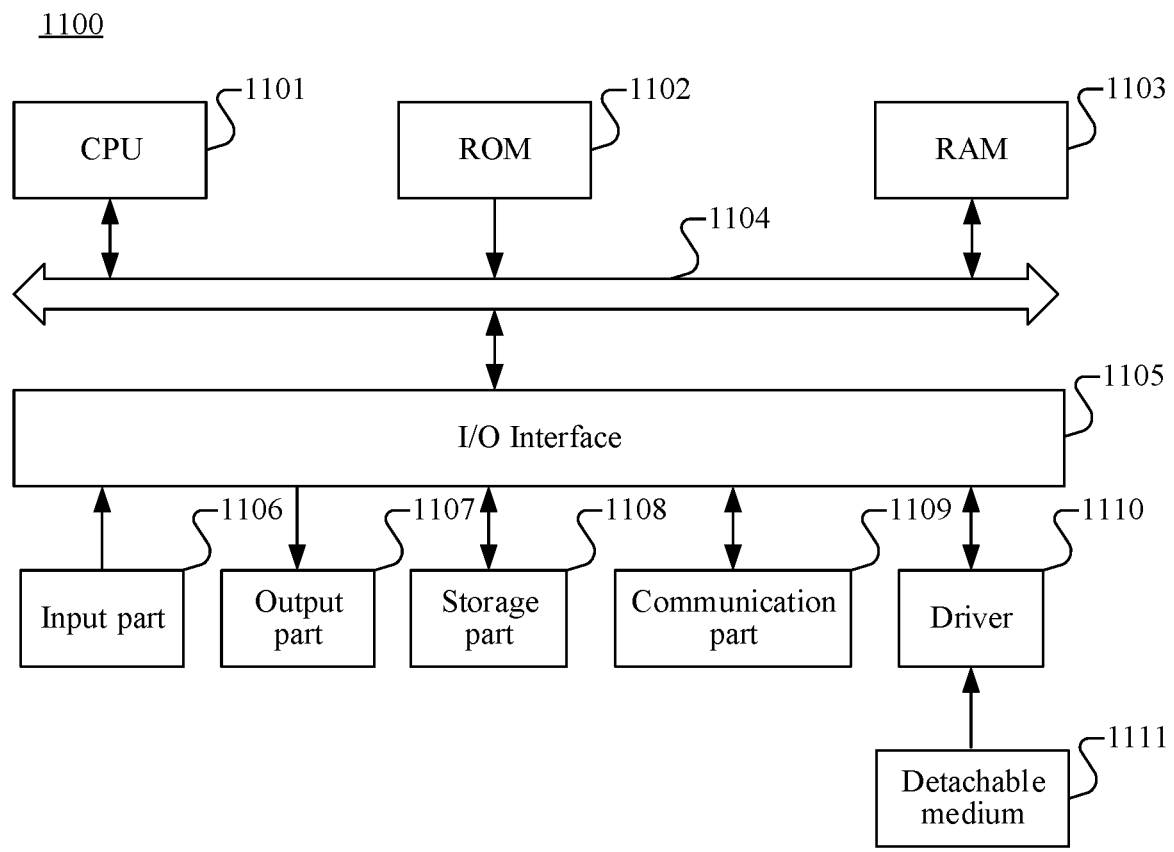
FIG. 11 schematically illustrates a schematic structural diagram of a computer system of an electronic device according to certain embodiment(s) of the present disclosure.

FIG. 11 is a schematic structural diagram of a computer system adapted to implement an electronic device according to an embodiment of the present disclosure.

The computer system 1100 of the electronic device shown in FIG. 11 is merely an example, and does not constitute any limitation on functions and use ranges of the embodiments of the present disclosure.

As shown in FIG. 11, the computer system 1100 comprises a central processing unit (CPU) 1101. The CPU 2301 may perform various appropriate actions and processing according to a program stored in a read-only memory (ROM) 1102 or a program loaded from a storage portion 1108 into a random access memory (RAM) 1103. The RAM 1103 further stores various programs and data required for operating the system. The CPU 1101, the ROM 1102, and the RAM 1103 are connected to each other through a bus 1104. An input/output (I/O) interface 1105 is also connected to the bus 1104.

Following components are connected to the I/O interface 1105: an input part 1106 including a keyboard and a mouse; an output part 1107 including a Cathode Ray Tube (CRT), a Liquid Crystal Display (LCD) and a loudspeaker; a storage part 1108 including a hard disk; and a communication part 1109 including a Local Area Network (LAN) card, a modem card and other network interface cards. The communication part 1109 performs communication processing by using a network such as the Internet. A driver 1110 is also connected to the I/O interface 1105 as required. A removable medium 1111, such as a magnetic disk, an optical disc, a magneto-optical disk, or a semiconductor memory, is installed on the drive 1110 as required, so that a computer program read from the removable medium is installed into the storage part 1108 as required.

Particularly, according to an embodiment of the present disclosure, the processes described in each method by referring to the flowcharts may be implemented as computer software programs. For example, an embodiment of the present disclosure includes a computer program product. The computer program product includes a computer program stored in a computer-readable medium. The computer program includes a program code used for performing a method shown in the flowchart. In such an embodiment, the computer program may be downloaded and installed through the communication part 1109 from a network, and/or installed from the removable medium 1111. When the computer program is executed by the CPU 1101, the various functions defined in the system of the present disclosure are executed.

The computer-readable medium shown in the embodiments of the present disclosure may be a computer-readable signal medium or a computer-readable storage medium or any combination thereof. The computer-readable storage medium may be, for example, but is not limited to, an electrical, magnetic, optical, electromagnetic, infrared, or semiconductor system, apparatus, or device, or any combination thereof. A more specific example of the computer-readable storage medium may include but is not limited to: An electrical connection having one or more wires, a portable computer magnetic disk, a hard disk, a random access memory (RAM), a read-only memory (ROM), an erasable programmable read-only memory (EPROM), a flash memory, an optical fiber, a compact disk read-only memory (CD-ROM), an optical storage device, a magnetic storage device, or any appropriate combination thereof. In the present disclosure, the computer-readable storage medium may be any tangible medium containing or storing a program, and the program may be used by or used in combination with an instruction execution system, an apparatus, or a device. In the present disclosure, the computer-readable signal medium may be a data signal included in a baseband or propagated as a part of a carrier, in which computer-readable program code is carried. The propagated data signal may be in a plurality of forms, including, but not limited to, an electromagnetic signal, an optical signal, or any appropriate combination thereof. The computer-readable signal medium may be further any computer-readable medium in addition to a computer-readable storage medium. The computer-readable medium may send, propagate, or transmit a program that is used by or used in combination with an instruction execution system, apparatus, or device. The program code included in the computer-readable medium may be transmitted using any suitable medium, including but not limited to: a wireless medium, a wire medium, or the like, or any suitable combination thereof.

The flowcharts and block diagrams in the accompanying drawings illustrate possible system architectures, functions, and operations that may be implemented by a system, a method, and a computer program product according to various embodiments of the present disclosure. In this regard, each box in the flowchart or the block diagram may represent a module, a program segment, or a part of code. The module, the program segment, or the part of code includes one or more executable instructions used for implementing specified logic functions. In some implementations used as substitutes, functions annotated in boxes may alternatively occur in a sequence different from that annotated in an accompanying drawing. For example, actually two boxes shown in succession may be performed basically in parallel, and sometimes the two boxes may be performed in a reverse sequence. This is determined by a related function. Each box in the block diagram or the flowchart, and a combination of blocks in the block diagram or the flowchart may be implemented by using a dedicated hardware-based system that performs a specified function or operation, or may be implemented by using a combination of dedicated hardware and computer instructions.

Although a plurality of modules or units of a device configured to perform actions are discussed in the detailed description, such division is not mandatory. Actually, according to the implementations of the present disclosure, the features and functions of two or more modules or units described above may be specified in one module or unit. Conversely, features and functions of one module or unit described above may be further divided into a plurality of modules or units for implementation.

Through the descriptions of the implementations, a person skilled in the art easily understands that the exemplary implementations described herein may be implemented through software, or may be implemented through software located in combination with suitable hardware. Therefore, the technical solutions of the embodiments of the present disclosure may be implemented in a form of a software product. The software product may be stored in a non-volatile storage medium (which may be a CD-ROM, a USB flash drive, a removable hard disk, or the like) or on the network, including several instructions for instructing a computing device (which may be a personal computer, a server, a touch terminal, a network device, or the like) to perform the methods according to the embodiments of the present disclosure.

The term unit (and other similar terms such as subunit, module, submodule, etc.) in this disclosure may refer to a software unit, a hardware unit, or a combination thereof. A software unit (e.g., computer program) may be developed using a computer programming language. A hardware unit may be implemented using processing circuitry and/or memory. Each unit can be implemented using one or more processors (or processors and memory). Likewise, a processor (or processors and memory) can be used to implement one or more units. Moreover, each unit can be part of an overall unit that includes the functionalities of the unit.

Other embodiments of the present disclosure will be apparent to a person skilled in the art from consideration of the present disclosure and practice of the present disclosure. The present disclosure is intended to cover any variation, use, or adaptive change of the present disclosure. These variations, uses, or adaptive changes follow the general principles of the present disclosure and include common general knowledge or common technical means in the art that are not disclosed in the present disclosure.

It is to be understood that the present disclosure is not limited to the precise structures described above and shown in the accompanying drawings, and various modifications and changes can be made without departing from the scope of the present disclosure. The scope of the present disclosure is subject only to the appended claims.

What is claimed is:

1. A decoder configuration method, executed by a computing device, the method comprising:
    acquiring at least two compatibility grade configurations used for configuring decoding parameters of a decoder, the different compatibility grade configurations being different in priority level, decoding property and decoder compatibility;
    selecting one compatibility grade configuration from the compatibility grade configurations according to the priority levels from high to low;
    configuring the decoder according to the compatibility grade configuration;
    starting the decoder, and performing decoding abnormality detection processing on the decoder to obtain an abnormality detection result; and
    performing hardware decoding processing on a to-be-decoded video according to the compatibility grade configuration to obtain a decoding processing result in response to a determination that the abnormality detection result indicates that the decoder is normal, and determining that the current compatibility grade configuration is applicable to the decoder in response to a determination that the decoding processing result indicates that decoding is successful.

2. The decoder configuration method according to claim 1, further comprising:
    acquiring the decoding parameters of the decoder and determining a parameter configuration rule corresponding to a decoding demand;
    configuring the decoding parameters according to the parameter configuration rule to obtain a plurality of configuration results of the decoding parameters, different configuration results corresponding to different decoding properties;
    setting at least two compatibility grades according to the decoding parameters, the different compatibility grades being different in decoder compatibility; and
    obtaining the at least two compatibility grade configurations according to parameter grade matched processing of the at least two compatibility grades and the plurality of configuration results.

3. The decoder configuration method according to claim 2, wherein the decoding parameters include frame rate setting parameters and decoding hoarded frame parameters, and the parameter configuration results include frame rate configuration results, hoarded frame configuration results and a default configuration result in which no configuration is performed on the decoding parameters, and
    performing the rule configuration processing on the decoding parameters comprises:
        configuring the frame rate setting parameters according to the parameter configuration rule to obtain a plurality of frame rate configuration results; and
        configuring the decoding hoarded frame parameters according to the parameter configuration rule to obtain a plurality of hoarded frame configuration results.

4. The decoder configuration method according to claim 3, wherein performing the parameter grade matched processing comprises:
    performing parameter grade matched processing on the at least two compatibility grades and the plurality of frame rate configuration results to obtain a first compatibility grade configuration; and
    performing parameter grade matched processing on the at least two compatibility grades and the plurality of hoarded frame configuration results to obtain a second compatibility grade configuration; and
    performing parameter grade matched processing on the at least two compatibility grades and the default configuration result to obtain a third compatibility grade configuration.

5. The decoder configuration method according to claim 2, further comprising:
    performing priority level configuration on the at least two compatibility grades to obtain priority levels of the at least two compatibility grades.

6. The decoder configuration method according to claim 1, further comprising:
    determining a next compatibility grade configuration of the current compatibility grade configuration from the at least two compatibility grade configurations according to the priority levels in response to a determination that the abnormality detection result indicates that the decoder is abnormal; and
    returning to the operation of configuring the decoder according to the compatibility grade configuration.

7. The decoder configuration method according to claim 1, further comprising:
    determining that the abnormality detection result indicates the decoder being abnormal in response to a determination that abnormal information transmitted by the decoder is received; and
    determining that the abnormality detection result indicates the decoder being normal in response to a determination that the abnormal information transmitted by the decoder is not received.

8. The decoder configuration method according to claim 1, further comprising:
    determining that a decoding processing result indicates successful decoding in response to a determination that a first-frame image of a to-be-decoded video is successfully decoded and outputted from the decoder.

9. The decoder configuration method according to claim 8, further comprising:
    determining a next compatibility grade configuration of the current compatibility grade configuration from the at least two compatibility grade configurations according to the priority levels in response to a determination that the decoding processing result indicates that decoding fails, and returning to the operation of configuring the decoder according to the compatibility grade configuration.

10. The decoder configuration method according to claim 8, further comprising:
    performing decoding overtime detection processing on the decoder to obtain an overtime detection result in response to a determination that the decoding processing result indicates that decoding fails; and performing decoding processing on other video frame images except the first-frame image in the to-be-decoded video in response to a determination that the overtime detection result indicates waiting overtime, and determining whether the current compatibility grade configuration is applicable to the decoder or not in the decoding process of other video frame images.

11. The decoder configuration method according to claim 10, wherein performing the decoding overtime detection processing comprises:
determining whether a decoding duration of the first-frame image of the to-be-decoded video is greater than a duration threshold or not according to the preset duration threshold; and
determining that the overtime detection result is waiting overtime in response to a determination that the decoding duration is greater than or equal to or greater than the duration threshold.

12. The decoder configuration method according to claim 10, further comprising:
returning to the operation of performing decoding abnormality detection processing on the decoder in response to a determination that the overtime detection result indicates waiting no overtime.

13. A decoder configuration apparatus, comprising: a memory storing computer program instructions; and a processor coupled to the memory and configured to execute the computer program instructions and perform:
acquiring at least two compatibility grade configurations used for configuring decoding parameters of a decoder, the different compatibility grade configurations being different in priority level, decoding property and decoder compatibility;
selecting one compatibility grade configuration from the compatibility grade configurations according to the priority levels from high to low;
configuring the decoder according to the compatibility grade configuration;
starting the decoder, and performing decoding abnormality detection processing on the decoder to obtain an abnormality detection result; and
performing hardware decoding processing on a to-be-decoded video according to the compatibility grade configuration to obtain a decoding processing result in response to a determination that the abnormality detection result indicates that the decoder is normal, and determining that the current compatibility grade configuration is applicable to the decoder in response to a determination that the decoding processing result indicates that decoding is successful.

14. The decoder configuration apparatus according to claim 13, wherein the processor is further configured to execute the computer program instructions and perform:
acquiring the decoding parameters of the decoder and determining a parameter configuration rule corresponding to a decoding demand;
configuring the decoding parameters according to the parameter configuration rule to obtain a plurality of configuration results of the decoding parameters, different configuration results corresponding to different decoding properties;
setting at least two compatibility grades according to the decoding parameters, the different compatibility grades being different in decoder compatibility; and
obtaining the at least two compatibility grade configurations according to parameter grade matched processing of the at least two compatibility grades and the plurality of configuration results.

15. The decoder configuration apparatus according to claim 14, wherein the decoding parameters include frame rate setting parameters and decoding hoarded frame parameters, and the parameter configuration results include frame rate configuration results, hoarded frame configuration results and a default configuration result in which no configuration is performed on the decoding parameters, and
performing the rule configuration processing on the decoding parameters includes:
configuring the frame rate setting parameters according to the parameter configuration rule to obtain a plurality of frame rate configuration results; and
configuring the decoding hoarded frame parameters according to the parameter configuration rule to obtain a plurality of hoarded frame configuration results.

16. The decoder configuration apparatus according to claim 15, wherein performing the parameter grade matched processing includes:
performing parameter grade matched processing on the at least two compatibility grades and the plurality of frame rate configuration results to obtain a first compatibility grade configuration; and
performing parameter grade matched processing on the at least two compatibility grades and the plurality of hoarded frame configuration results to obtain a second compatibility grade configuration; and
performing parameter grade matched processing on the at least two compatibility grades and the default configuration result to obtain a third compatibility grade configuration.

17. The decoder configuration apparatus according to claim 14, wherein the processor is further configured to execute the computer program instructions and perform:
performing priority level configuration on the at least two compatibility grades to obtain priority levels of the at least two compatibility grades.

18. The decoder configuration apparatus according to claim 13, wherein the processor is further configured to execute the computer program instructions and perform:
determining a next compatibility grade configuration of the current compatibility grade configuration from the at least two compatibility grade configurations according to the priority levels in response to a determination that the abnormality detection result indicates that the decoder is abnormal; and
returning to the operation of configuring the decoder according to the compatibility grade configuration.

19. The decoder configuration apparatus according to claim 13, wherein the processor is further configured to execute the computer program instructions and perform:
determining that the abnormality detection result indicates the decoder being abnormal in response to a determination that abnormal information transmitted by the decoder is received; and
determining that the abnormality detection result indicates the decoder being normal in response to a determination that the abnormal information transmitted by the decoder is not received.

20. A non-transitory computer-readable storage medium storing computer program instructions executable by at least one processor to perform:

acquiring at least two compatibility grade configurations used for configuring decoding parameters of a decoder, the different compatibility grade configurations being different in priority level, decoding property and decoder compatibility;

selecting one compatibility grade configuration from the compatibility grade configurations according to the priority levels from high to low;

configuring the decoder according to the compatibility grade configuration;

starting the decoder, and performing decoding abnormality detection processing on the decoder to obtain an abnormality detection result; and performing hardware decoding processing on a to-be-decoded video according to the compatibility grade configuration to obtain a decoding processing result in response to a determination that the abnormality detection result indicates that the decoder is normal, and determining that the current compatibility grade configuration is applicable to the decoder in response to a determination that the decoding processing result indicates that decoding is successful.

\* \* \* \* \*